(12) United States Patent
Yang et al.

(10) Patent No.: US 11,932,478 B1
(45) Date of Patent: Mar. 19, 2024

(54) METHOD FOR MANUFACTURING AND PACKAGING SPECIAL-SHAPED CIGARETTE

(71) Applicant: CHINA TOBACCO YUNNAN INDUSTRIAL CO., LTD, Kunming (CN)

(72) Inventors: Xi Yang, Kunming (CN); Yuan Tian, Kunming (CN); Ying Wu, Kunming (CN); Fangrui Chen, Kunming (CN); Zhijiang Yin, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 18/548,224

(22) PCT Filed: Nov. 2, 2021

(86) PCT No.: PCT/CN2021/128255
§ 371 (c)(1),
(2) Date: Aug. 29, 2023

(87) PCT Pub. No.: WO2023/045034
PCT Pub. Date: Mar. 30, 2023

(30) Foreign Application Priority Data

Sep. 22, 2021 (CN) .......................... 202111107278.5

(51) Int. Cl.
*B65D 85/10* (2006.01)
*B65B 19/02* (2006.01)
*B65D 57/00* (2006.01)

(52) U.S. Cl.
CPC .......... *B65D 85/1081* (2013.01); *B65B 19/02* (2013.01); *B65D 85/1045* (2013.01); *B65D 57/005* (2020.05)

(58) Field of Classification Search
CPC ............ B65D 85/1045; B65D 85/1081; B65D 57/005; B65D 19/02
See application file for complete search history.

(56) References Cited

U.S. PATENT DOCUMENTS

| 5,575,385 A | * | 11/1996 | Zona | B31D 3/0284 206/256 |
| 2014/0001066 A1 | * | 1/2014 | Dong | B65D 85/1048 206/256 |

FOREIGN PATENT DOCUMENTS

| CH | 586136 A5 | 3/1977 |
| CN | 2085602 U | 10/1991 |

(Continued)

*Primary Examiner* — Andrew M Tecco
(74) *Attorney, Agent, or Firm* — Bayramoglu Law Offices LLC

(57) ABSTRACT

A method for manufacturing and packaging a special-shaped cigarette includes the following steps: designing inner packaging case paper capable of being folded into a special-shaped cigarette accommodating cavity; folding the inner packaging case paper to form the special-shaped cigarette accommodating cavity; filling an interior of the special-shaped cigarette accommodating cavity with an ordinary cigarette; and shelving for a certain period of time, so that a cross section of the ordinary cigarette changes from a circle to a special shape, and the ordinary cigarette is accommodated in the special-shaped cigarette accommodating cavity. A diameter of an inscribed circle of the special-shaped cigarette accommodating cavity is less than a diameter of the ordinary cigarette, and a material of the inner packaging case paper is a paperboard or a food grade PVC sheet.

8 Claims, 8 Drawing Sheets

(56) References Cited

FOREIGN PATENT DOCUMENTS

| | | | | |
|---|---|---|---|---|
| CN | 101467793 A | 7/2009 | | |
| CN | 203319000 U | 12/2013 | | |
| CN | 109998163 A | * 7/2019 | ............. | A24C 5/345 |
| CN | 109998163 A | 7/2019 | | |
| CN | 110203561 A | 9/2019 | | |
| CN | 210382606 U | 4/2020 | | |
| EP | 0647411 A1 | 4/1995 | | |
| GB | 2422368 A | 7/2006 | | |
| KR | 20110043356 A | * 4/2011 | ............. | A24F 15/12 |
| KR | 20110043356 A | 4/2011 | | |

\* cited by examiner

METHOD FOR MANUFACTURING AND PACKAGING SPECIAL-SHAPED CIGARETTE

CROSS REFERENCE TO THE RELATED APPLICATIONS

This application is the national phase entry of International Application No. PCT/CN2021/128255, filed on Nov. 2, 2021, which is based upon and claims priority to Chinese Patent Application No. 202111107278.5, filed on Sep. 22, 2021, the entire contents of which are incorporated herein by reference.

TECHNICAL FIELD

The present invention relates to the technical field of cigarette packaging cases, in particular to a method for manufacturing and packaging a special-shaped cigarette.

BACKGROUND

Currently, most cigarettes on the market are cylindrical in shape. With the development and progress of a cigarette technology, there are cigarettes with unconventional shapes, such as a cuboid cigarette (a cigarette with a section being a square), or a variant cigarette with a cross section at one end being square and a cross section at the other end being circular, a triangular-prism cigarette (a cigarette with a section being a triangle), or a hexagonal-cylinder cigarette (a cigarette with a section being a hexagon). If customized mechanical equipment is used to produce such special-shaped cigarette structures, not only will it lead to a significant increase in cigarette cost, but also formed cigarettes cannot be packaged, stored, transported, or sold by using conventional cigarette cases.

Due to the difference in cross section between special-shaped cigarettes and conventional cigarettes, if the formed special-shaped cigarettes are accommodated by using an existing packaging technology and a conventional cigarette packaging case, problems in two aspects may be easily caused:

1, cigarette filling is extremely inconvenient, the formed cigarettes cannot maintain the current shape, and it is prone to having scattered cigarette groups and uneven slit sizes inside a case body, resulting in shaking and moving during storage and transportation due to the inability to fix positions of the cigarettes, and resulting in extruding deformation of the cigarettes and scattered tobacco shreds; and 2, there is also a serious problem of deformation of the packaging case due to a too large gap in an inner cavity of the packaging case.

If a customized cigarette packaging case is tailored for the special-shaped cigarette, the cost is too high, and it is not conducive to promotion and popularization of square cigarettes.

Therefore, how can conventional cigarettes be changed into the special-shaped cigarettes only through a special packaging method without mechanical machining, and be conveniently filled into a cigarette packaging case (a square cavity) with an existing specification, while meeting packaging requirements of the cigarettes, including stabilizing the positions of the cigarettes during transportation and storage to avoid cigarette deformation and facilitate taking for use, is what people hope for.

In order to solve the above problems, the present invention is proposed.

SUMMARY

The objective of the present invention is to provide a method for manufacturing and packaging a special-shaped cigarette without mechanical machining. Inner packaging case paper for the special-shaped cigarette is designed, and a conventional cigarette is changed into a square cigarette through a special packaging method to solve a technical problem existing by using an existing packaging technology and a conventional cigarette packaging case to accommodate a formed square cigarette.

The present invention provides a method for manufacturing and packaging a special-shaped cigarette, including the following steps:

1) designing inner packaging case paper capable of being folded into a special-shaped cigarette accommodating cavity;

2) folding the inner packaging case paper to form the special-shaped cigarette accommodating cavity;

3) filling an interior of the special-shaped cigarette accommodating cavity with an ordinary cigarette; and 4) shelving for a certain period of time, so that a cross section of the ordinary cigarette changes from a circle to a special shape under fixing and extruding effects of the special-shaped cigarette accommodating cavity and the ordinary cigarette is accommodated in the special-shaped cigarette accommodating cavity, wherein a diameter of an inscribed circle of the special-shaped cigarette accommodating cavity is less than a diameter of the ordinary cigarette, and a material of the inner packaging case paper is a paperboard or a food grade polyvinyl chloride (PVC) sheet.

Preferably, the special-shaped cigarette includes a square cigarette with a cross section being a square; a square-circle combined cigarette with a cross section at one end being a circle and a cross section at the other end being a square; a triangular cigarette with a cross section being a triangle; or a hexagonal cigarette with a cross section being a hexagon.

Specifically, for each case of special-shaped cigarette,

Inner Packaging Case Paper of a Square Cigarette:

the packaging case paper includes a square-cigarette filling and compressing positioning sleeve F1, a square-cigarette middle layer spacing sleeve F2, and a square-cigarette partition board F4; the square-cigarette filling and compressing positioning sleeve F1 includes a square-cigarette first folding baffle F11, a square-cigarette second folding baffle F12, a square-cigarette third folding baffle F13, a square-cigarette fourth folding baffle F14, a square-cigarette fifth folding baffle F15, and a square-cigarette sixth folding baffle F16, and the square-cigarette filling and compressing positioning sleeve F1 is capable of being folded into a first cuboid; and the square-cigarette second folding baffle F12, the square-cigarette third folding baffle F13, the square-cigarette fourth folding baffle F14, and the square-cigarette sixth folding baffle F16 are sequentially connected with four edges of the square-cigarette first folding baffle F11 to serve as four side surfaces of the first cuboid, the square-cigarette first folding baffle F11 serves as a bottom surface of the first cuboid, and the square-cigarette fifth folding baffle F15 serves as a top surface of the first cuboid;

the square-cigarette third folding baffle F13 and the square-cigarette second folding baffle F12 have the same size and shape, and are respectively located on left and right sides of the square-cigarette first folding baffle F11, two square-cigarette first folding lug F17 are respectively connected to one end of the square-cigarette second folding baffle F12 far away from the square-cigarette first folding baffle F11 and one end of the square-cigarette third folding baffle F13 far away from the square-cigarette first folding baffle F11, and one end of each square-cigarette first folding lug F17 far away from the square-cigarette first folding baffle F11 has a square-cigarette first pin F171;

the square-cigarette fourth folding baffle F14 and the square-cigarette sixth folding baffle F16 are respectively located on upper and lower sides of the square-cigarette first folding baffle F11, one end of the square-cigarette fourth folding baffle F14 far away from the square-cigarette first folding baffle F11 is connected with the square-cigarette fifth folding baffle F15, and the square-cigarette fifth folding baffle F15 is provided with a square-cigarette first pre-notch F151 corresponding to the square-cigarette first pins F171;

a square-cigarette second folding lug F18 and a square-cigarette third folding lug F19 are sequentially connected to one end of the square-cigarette sixth folding baffle F16 far away from the square-cigarette first folding baffle F11, a connection part of the square-cigarette sixth folding baffle F16 and the square-cigarette second folding lug F18 is provided with a square-cigarette pull buckle F161, and the square-cigarette second folding lug F18 and the square-cigarette third folding lug F19 are capable of being inserted into the first cuboid from the top surface of the first cuboid;

the square-cigarette second folding lug F18 and the square-cigarette third folding lug F19 are capable of being pulled out of first cuboid by pulling the square-cigarette pull buckle F161 by hand, making it convenient for a consumer to take out the cigarette;

the square-cigarette middle layer spacing sleeve F2 includes a square-cigarette seventh folding baffle F21, a square-cigarette eighth folding baffle F22, and a square-cigarette ninth folding baffle F24, and the square-cigarette middle layer spacing sleeve F2 is capable of being folded into a second cuboid with an opening in a side surface; and the square-cigarette seventh folding baffle F21 serves as a top surface of the second cuboid, the square-cigarette eighth folding baffle F22 serves as a bottom surface of the second cuboid, and the square-cigarette seventh folding baffle F21 is connected with the square-cigarette eighth folding baffle F22 through the square-cigarette ninth folding baffle F24;

the square-cigarette eighth folding baffle F22 has a square second pre-notch F221, left and right sides of the square-cigarette eighth folding baffle F22 extend outwards to have a square tenth folding baffle F23, one end of the square tenth folding baffle F23 far away from the square-cigarette eighth folding baffle F22 has a second pin F231, the square tenth folding baffle F23 is provided with a crease line, by overturning and folding along the crease line, the second pin F231 is capable of being inserted into the square second pre-notch F221, and the square tenth folding baffle F23 forms a third cuboid with a cavity structure on the left and right sides of the square-cigarette eighth folding baffle F22;

the second cuboid is inserted into the first cuboid, a top and bottom of the second cuboid form a fourth cuboid cavity with a top and bottom of the first cuboid respectively, and an inner cavity of the second cuboid and the fourth cuboid cavity limit shapes and sizes of the cigarettes so as to generate fixing and extruding effects on the cigarettes;

the square-cigarette partition board F4 includes a square plate main body F41 and a plurality of square-cigarette vertical spacers F42 perpendicular to the square plate main body F41 and erected on the square plate main body F41, each square-cigarette vertical spacer F42 is inserted into a gap between the adjacent cigarettes so as to generate the fixing and extruding effects on the cigarettes on two sides of the square-cigarette vertical spacer F42; and circular cigarettes in the second cuboid and the fourth cuboid are changed into square cigarettes under three kinds of fixing and extruding of the square-cigarette filling and compressing positioning sleeve F1, the square-cigarette middle layer spacing sleeve F2, and the square-cigarette partition board F4.

Preferably, each layer of cigarettes is provided with the independent square-cigarette partition board F4, and the quantity of the square-cigarette vertical spacers F42 is equal to the quantity of cigarettes in each layer minus one, that is, the quantity of the square-cigarette vertical spacers F42 is equal to the quantity of gaps between the cigarettes in each layer.

Preferably, a distance between the adjacent square-cigarette vertical spacers F42 is less than a diameter of the cigarette, or a height of each square-cigarette vertical spacer F42 is less than the diameter of the cigarette, or the distance between the adjacent square-cigarette vertical spacers F42 and the height of square-cigarette vertical spacers F42 are both less than the diameter of the cigarette. That is to say, in order to achieve the effect of extruding the cigarettes, at least one of the distance between the adjacent square-cigarette vertical spacers F42, or the height of the square-cigarette vertical spacers F42 must be less than the diameter of the cigarette. That is to say, a diameter of an inscribed circle of a cavity accommodating the independent cigarette is less than the diameter of the cigarette.

Preferably, materials of the square-cigarette filling and compressing positioning sleeve F1, the square-cigarette middle layer spacing sleeve F2, and the square-cigarette partition board F4 are preferably materials with good stiffness, strong support, and a little sealing effect, such as a back of a paperboard to be coated and applied with a hydrating and moisturizing coating, such as a nano ceramic coating and a food grade PVC sheet.

Preferably, the material of the square-cigarette middle layer spacing sleeve F2 is preferably a material with good stiffness and strong support, such as the paperboard and the food grade PVC sheet, so that the cigarette may be limited in a cavity with a specific shape and size, and fixing and extruding effects are generated on the cigarette.

Preferably, two square-cigarette first pre-notches F151 are provided, and two square-cigarette first pins F171 corresponding to the square-cigarette first pre-notches are also provided.

Preferably, four square second pre-notches F221 are provided, and four second pins F231 corresponding to the square second pre-notches are also provided.

A folding method of the inner packaging case paper of the square cigarette:

the method includes the following steps:

folding a square-cigarette middle layer spacing sleeve F2 into a second cuboid with an opening in a side surface:

a, overturning and folding a square tenth folding baffle F23 along crease lines towards a square-cigarette eighth folding baffle F22, and inserting second pins F231 of the square tenth folding baffle F23 into a square second pre-notches F221, so that the square tenth folding baffle forms a third cuboid with a cavity structure on left and right sides of the square-cigarette eighth folding baffle F22; and b, overturning and folding a square-cigarette seventh folding baffle F21 and a square-cigarette ninth folding baffle F24 towards the square-cigarette eighth folding baffle F22 through the crease lines, so that the square-cigarette seventh folding baffle F21 is relatively parallel to the square-cigarette eighth folding baffle F22, and the square-cigarette seventh folding baffle F21, the square-cigarette ninth folding baffle F24, the square-cigarette eighth folding baffle F22 and the third cuboid are combined into a second cuboid with an opening in a side surface;

folding the square-cigarette filling and compressing positioning sleeve F1 into the first cuboid:

c, folding a square-cigarette second folding baffle F12, a square-cigarette third folding baffle F13, a square-cigarette fourth folding baffle F14, and a square-cigarette sixth folding baffle F16 of a square-cigarette filling and compressing positioning sleeve F1 inwards along an edge adjacent to a square-cigarette first folding baffle F11, so that the square-cigarette second folding baffle F12 is relatively parallel to the square-cigarette third folding baffle F13, and the square-cigarette fourth folding baffle F14 is perpendicular to the square-cigarette first folding baffle F11;

d, folding a square-cigarette fifth folding baffle F15 towards the square-cigarette first folding baffle F11 along an edge adjacent to the square-cigarette fourth folding baffle F14, so that the square-cigarette fifth folding baffle F15 is relatively parallel to the square-cigarette first folding baffle F11;

e, folding a square-cigarette first folding lug F17 along an edge adjacent to the square-cigarette second folding baffle F12 and the square-cigarette third folding baffle F13, so that square-cigarette first pins F171 of the square-cigarette first folding lug F17 are inserted into square-cigarette first pre-notches F151 corresponding to the square-cigarette fifth folding baffle F15; and f, folding a square-cigarette second folding lug F18 and a square-cigarette third folding lug F19 on a top of the square-cigarette sixth folding baffle F16 to be inserted into the first cuboid from a top surface of the first cuboid through the square-cigarette filling and compressing positioning sleeve F1; and providing a square-cigarette partition board F4, which does not require folding.

A cigarette case containing the inner packaging case paper of the square cigarette described in the present invention:

a cigarette case, includes the packaging case paper described in the present invention, the cigarette case further includes a square case body F3, a square-cigarette middle layer spacing sleeve F2 is located in a square-cigarette filling and compressing positioning sleeve F1, and the square-cigarette filling and compressing positioning sleeve F1 is located in the square case body F3;

the square case body F3 internally has a cigarette accommodating cavity;

the cigarette accommodating cavity is divided into an upper layer, a middle layer and a lower layer, the upper layer and the lower layer are fourth cuboid cavities, the middle layer is a second cuboid inner cavity, and each layer of cigarettes is internally provided with an independent square-cigarette partition board F4; and circular cigarettes in a second cuboid and a fourth cuboid are changed into square cigarettes under three kinds of fixing and extruding of the square-cigarette filling and compressing positioning sleeve F1, the square-cigarette middle layer spacing sleeve F2, and the square-cigarette partition board F4.

Preferably, the upper layer and the lower layer each have seven cigarettes, the square-cigarette partition board F4 correspondingly used for the upper layer and the lower layer has six square-cigarette vertical spacers F42, while the middle layer has six cigarettes, and the partition board correspondingly used for the middle layer has five square-cigarette vertical spacers F42. Each square-cigarette vertical spacer F42 is located in a gap between the adjacent cigarettes.

The square case body F3 is a conventional cigarette packaging case, and the cigarette packaging case is a packaging case for packaging the plurality of cigarettes.

In the present invention, a chamber inside a solid cuboid formed after folding the folding baffle is called the cuboid inner cavity, and a chamber formed between the cuboids is called the cuboid cavity.

Inner Packaging Case Paper of a Square-Circle Combined Cigarette:

the square-circle combined cigarette has a cross section at one end being a circle and a cross section at the other end being a square; and the inner packaging case paper includes a square-circular-cigarette filling and compressing positioning sleeve FY1, a square-circular-cigarette inner cavity fixing sleeve FY2, a square-circular-cigarette middle layer fixing sleeve FY3, and a square-circular-cigarette partition board FY4; and the square-circular-cigarette filling and compressing positioning sleeve FY1 is the same as the square-cigarette filling and compressing positioning sleeve F1, and the quantity and position of the folding plates inside are also the same.

The square-circular-cigarette inner cavity fixing sleeve FY2 includes a square-circular-cigarette first side plate FY21, left and right sides of the square-circular-cigarette first side plate FY21 are respectively connected with square-circular-cigarette second side plates FY22, one end of each square-circular-cigarette second side plate FY22 far away from the square-circular-cigarette first side plate FY21 is connected with a square-circular-cigarette third side plate FY23, and upper and lower edges of the square-circular-cigarette third side plate FY23 have square-circular-cigarette side wings FY231;

the square-circular-cigarette second side plate FY22 and the square-circular-cigarette third side plate FY23 are folded towards a side of the square-circular-cigarette first side plate FY21, and the square-circular-cigarette side wings FY231 are folded towards a side of the square-circular-cigarette second side plate FY22 to be capable of forming a square-circular-cigarette trapezoidal groove FY5, the square-circular-cigarette first side plate FY21 is a plane where an upper bottom of the square-circular-cigarette trapezoidal groove FY5 is located, the square-circular-cigarette third side plate FY23 is a plane where a waist of the square-circular-cigarette trapezoidal groove FY5 is located, and the square-circular-cigarette second side plate FY22 is perpendicular to the square-circular-cigarette first side plate FY21 and is located on an outer side of the square-circular-cigarette third side plate FY23; and the square-circular-cigarette second side plate FY22, the square-circular-cigarette third side plate FY23 and the square-circular-cigarette side wings FY231 are folded to form a square-circular-cigarette triangular prism FY51, and a bottom surface of the square-circular-cigarette triangular prism FY51 is located on the square-circular-cigarette first side plate FY21, so as to define the plane where the upper bottom of the square-circular-cigarette trapezoidal groove FY5 is located;

the square-circular-cigarette middle layer fixing sleeve FY3 includes two square-circular-cigarette fourth side plates FY31, two square-circular-cigarette fifth side plates FY32, two square-circular-cigarette sixth side plates FY33, and one square-circular-cigarette seventh side plate FY34;

the square-circular-cigarette sixth side plates FY33 and the square-circular-cigarette fifth side plate FY32 are located on two sides of the square-circular-cigarette fourth side plate FY31, and the square-circular-cigarette seventh side plate FY34 is located between the two square-circular-cigarette sixth side plates FY33; and the square-circular-cigarette fifth side plates FY32 and the square-circular-cigarette sixth side plates FY33 are consistent in size and shape;

the square-circular-cigarette seventh side plate FY34 is a first isosceles trapezoid, one side close to the square-circular-cigarette fourth side plates FY31 is a bottom of the first isosceles trapezoid, the square-circular-cigarette seventh side plate FY34 has a second isosceles trapezoid crease line, similarly, one side close to the square-circular-cigarette fourth side plates FY31 is a bottom of the second isosceles trapezoid crease line, the square-circular-cigarette seventh side plates FY34 is capable of being folded to form a square-circular-cigarette trapezoidal protrusion FY341 by folding along the second isosceles trapezoid crease line, and a trapezoidal notch corresponding to the square-circular-cigarette seventh side plate FY34 is formed between the two square-circular-cigarette fifth side plates FY32;

the square-circular-cigarette fifth side plates FY32 are folded towards a direction of the square-circular-cigarette sixth side plates FY33 through the square-circular-cigarette fourth side plates FY31, the square-circular-cigarette fifth side plates FY32 are relatively parallel to the square-circular-cigarette sixth side plates FY33 to be capable of forming two right-angle grooves, and the square-circular-cigarette trapezoidal protrusion FY341 is located between the two right-angle grooves;

the right-angle grooves are inserted in the square-circular-cigarette trapezoidal groove FY5, the square-circular-cigarette trapezoidal groove FY5 is wrapped with a first cuboid to form an upper layer, a middle layer and a lower layer, and the right-angle grooves are the middle layer;

the square-circular-cigarette partition board FY4 includes a square-circular-cigarette plate main body FY41 and a plurality of square-circular-cigarette vertical spacers FY42 perpendicular to the square-circular-cigarette plate main body FY41 and erected on the square-circular-cigarette plate main body FY41, and each square-circular-cigarette vertical spacer FY42 is inserted into a gap between the adjacent cigarettes so as to generate fixing and extruding effects on cigarettes on two sides of the square-circular-cigarette vertical spacer FY42; and circular cigarettes in the square-circular-cigarette trapezoidal groove FY5 are changed into cigarettes with one ends being square and the other ends being circular under four kinds of fixing and extruding of the square-circular-cigarette filling and compressing positioning sleeve FY1, the square-circular-cigarette inner cavity fixing sleeve FY2, the square-circular-cigarette middle layer fixing sleeve FY3, and the square-circular-cigarette partition board FY4.

Preferably, each layer of cigarettes is provided with the independent square-circular-cigarette partition board FY4, and the quantity of the square-circular-cigarette vertical spacers FY42 is equal to the quantity of cigarettes in each layer minus one.

Preferably, a distance between the adjacent square-circular-cigarette vertical spacers FY42 is less than a diameter of the cigarette, or a height of each square-circular-cigarette vertical spacer FY42 is less than the diameter of the cigarette, or the distance between the adjacent square-circular-cigarette vertical spacers FY42 and the height of square-circular-cigarette vertical spacers FY42 are both less than the diameter of the cigarette. That is to say, a diameter of an inscribed circle of a cavity accommodating the independent cigarette is less than the diameter of the cigarette.

Preferably, materials of the square-circular-cigarette filling and compressing positioning sleeve FY1, the square-circular-cigarette inner cavity fixing sleeve FY2, the square-circular-cigarette middle layer fixing sleeve FY3, and the square-circular-cigarette partition board FY4 are selected from paperboards or food grade PVC sheets.

A folding method of inner packaging case paper of a square-circle combined cigarette utilizes the packaging case paper described in the first aspect of the present invention, and includes the following steps:

folding a square-circular-cigarette inner cavity fixing sleeve FY2 into a trapezoidal groove;

a, folding a square-circular-cigarette second side plate FY22 and a square-circular-cigarette third side plate FY23 towards a side of a square-circular-cigarette first side plate FY21, the square-circular-cigarette second side plate FY22 being perpendicular to the square-circular-cigarette first side plate FY21, and folding square-circular-cigarette side wings FY231 towards the square-circular-cigarette second side plate FY22 to be capable of forming a square-circular-cigarette trapezoidal groove FY5, wherein the square-circular-cigarette first side plate FY21 is a plane where an upper bottom of the square-circular-cigarette trapezoidal groove FY5 is located, the square-circular-cigarette third side plate FY23 is a plane where a waist of the square-circular-cigarette trapezoidal groove FY5 is located, and the square-circular-cigarette second side plate FY22 is perpendicular to the square-circular-cigarette first side plate FY21 and is located on an outer side of the square-circular-cigarette third side plate FY23; and the square-circular-cigarette second side plate FY22, the square-circular-cigarette third side plate FY23 and the square-circular-cigarette side wings FY231 are folded to form a square-circular-cigarette triangular prism FY51, and a bottom surface of the square-circular-cigarette triangular prism FY51 is located on the square-circular-cigarette first side plate FY21, so as to define the plane where the upper bottom of the square-circular-cigarette trapezoidal groove FY5 is located;

folding a square-circular-cigarette middle layer fixing sleeve FY3 into a right-angle groove;

b, folding along a second isosceles trapezoidal crease line to fold a square-circular-cigarette seventh side plate FY34 into a square-circular-cigarette trapezoidal protrusion FY341, and folding a square-circular-cigarette fifth side plates FY32 towards a direction of a square-circular-cigarette sixth side plates FY33 through a square-circular-cigarette fourth side plates FY31, so that the square-circular-cigarette fifth side plates FY32 are relatively parallel to the square-circular-cigarette sixth side plates FY33 to be capable of forming two right-angle grooves, and the square-circular-cigarette trapezoidal protrusion FY341 is located between the two right-angle grooves;

folding a square-circular-cigarette filling and compressing positioning sleeve FY1 into a first cuboid, which is consistent with the folding method of the square-cigarette filling and compressing positioning sleeve F1; and providing a square-circular-cigarette partition board FY4, which does not require folding.

Preferably, a cigarette case further includes a square-circular-cigarette case body FY6, the square-circular-cigarette middle layer fixing sleeve FY3 is located within the square-circular-cigarette inner cavity fixing sleeve FY2, the square-circular-cigarette inner cavity fixing sleeve FY2 is located within the square-circular-cigarette filling and compressing positioning sleeve FY1, and the square-circular-cigarette filling and compressing positioning sleeve FY1 is located within the square-circular-cigarette case body FY6;

the square-circular-cigarette case body FY6 internally has a cigarette accommodating cavity;

the cigarette accommodating cavity is divided into an upper layer, a middle layer and a lower layer, the right-angle grooves folded from the square-circular-cigarette middle layer fixing sleeve FY3 are inserted in the trapezoidal groove folded from the square-circular-cigarette inner cavity fixing sleeve FY2, the trapezoidal groove is wrapped with the first cuboid to form an upper layer, a middle layer and a lower layer, and the right-angle grooves are the middle layer; and each layer of cigarettes is internally provided with the independent square-circular-cigarette partition board FY4; and circular cigarettes in the square-circular-cigarette trapezoidal groove FY5 are changed into square-circle combined cigarettes under four kinds of fixing and extruding of the square-circular-cigarette filling and compressing positioning sleeve FY1, the square-circular-cigarette inner cavity fixing sleeve FY2, the square-circular-cigarette middle layer fixing sleeve FY3, and the square-circular-cigarette partition board FY4.

Preferably, the upper layer and the lower layer each have seven cigarettes, the square-circular-cigarette partition board F4 correspondingly used for the upper layer and the lower layer has six square-circular-cigarette vertical spacers FY42, while the middle layer has six cigarettes, and the partition board correspondingly used for the middle layer has five square-circular-cigarette vertical spacers FY42. Each square-circular-cigarette vertical spacer FY42 is located in a gap between the adjacent cigarettes.

In order to ensure that only one end of the cigarette is square, in the present invention, lengths of the square-circular-cigarette middle layer fixing sleeve FY3 and the square-circular-cigarette partition board FY4 are only half of an axial length of the cigarette.

Inner Packaging Case Paper of a Triangular Cigarette:

the packaging case paper includes a triangular-cigarette first inner cavity partition board S1 and a triangular-cigarette second inner cavity partition board S2;

the triangular-cigarette first inner cavity partition board S1 is provided with a plurality of parallel crease lines in advance, and is folded along the crease lines into a triangular-cigarette first triangular protrusion S11 and a triangular-cigarette first triangular groove S12 that are sequentially connected and have a cross section being a triangle, and the triangular-cigarette first triangular protrusion S11 and the triangular-cigarette first triangular groove S12 have the same size and shape;

the triangular-cigarette second inner cavity partition board S2 is provided with a plurality of parallel crease lines in advance, and is folded along the crease lines into a triangular-cigarette second triangular protrusion S21 and a triangular-cigarette second triangular groove S22 that are sequentially connected and have a cross section being a triangle, the triangular-cigarette second triangular protrusion S21 and the triangular-cigarette second triangular groove S22 have the same size and shape, and the triangular-cigarette second triangular groove S22 internally has a vertical triangular-cigarette spacer S23;

the folded triangular-cigarette first inner cavity partition board S1 and triangular-cigarette second inner cavity partition board S2 are stacked in an obverse-reverse opposite mode, the triangular-cigarette first triangular protrusion S11 of the triangular-cigarette first inner cavity partition board S1 on the upper layer is opposite to the triangular-cigarette second triangular groove S22 of the triangular-cigarette second inner cavity partition board S2 on the lower layer to be capable of forming a plurality of sequentially connected cigarette accommodating cavities with the cross section being a rhombus, and the vertical triangular-cigarette spacer S23 in the triangular-cigarette second triangular groove S22 is respectively connected to a triangular vertex of the triangular-cigarette first triangular protrusion S11 on the upper layer and a triangular vertex of the triangular-cigarette second triangular groove S22 on the lower layer, so as to divide the rhombic cigarette accommodating cavities into middle-layer triangular accommodating cavities on two sides of the vertical triangular-cigarette spacer S23; and the triangular-cigarette first triangular groove S12 is an upper-layer triangular accommodating cavity, and the triangular-cigarette second triangular protrusion S21 is a lower-layer triangular accommodating cavity; and the upper-layer triangular accommodating cavity, the middle-layer triangular accommodating cavities and the lower-layer triangular accommodating cavity generate fixing and extruding effects on the cigarettes, so that cross sections of circular cigarettes become triangles and the circular cigarettes are accommodated in the accommodating cavities. In order to achieve the effect of extruding the cigarettes, a diameter of an inscribed circle of a cavity accommodating the independent cigarette is less than a diameter of the cigarette, that is, diameters of the inscribed circles of the upper-layer triangular accommodating cavity, the middle-layer triangular accommodating cavities and the lower-layer triangular accommodating cavity are less than the diameter of the cigarette.

Preferably, a point where the triangular-cigarette first triangular groove S12 is connected with the triangular-cigarette second triangular protrusion S21 is a vertex of an upper-layer triangle and a lower-layer triangle, and the middle-layer triangular accommodating cavities on two sides of the vertex, the upper-layer triangular accommodating cavity above the vertex and the lower-layer triangular accommodating cavity below the vertex together form a square; two edges of the triangular-cigarette first triangular groove S12 are upper-part diagonal lines of the square, two edges of the triangular-cigarette second triangular protrusion S21 are lower-part diagonal lines of the square, and the vertical triangular-cigarette spacers S23 on left and right sides are two edges of the square; and the vertex is an intersection of the diagonal lines of the square.

Preferably, heights of triangles of the upper-layer triangular accommodating cavity, the middle-layer triangular accommodating cavities and the lower-layer triangular accommodating cavity are equal to half of a bottom edge of the triangle.

Preferably, five upper-layer triangular accommodating cavities are provided, five lower-layer triangular accommodating cavities are provided, and ten middle-layer triangular accommodating cavities are provided.

Preferably, materials of the triangular-cigarette first inner cavity partition board S1 and the triangular-cigarette second inner cavity partition board S2 are paperboards or food grade PVC sheets.

Materials of the triangular-cigarette first inner cavity partition board S1 and the triangular-cigarette second inner cavity partition board S2 are preferably materials with good stiffness and strong support, such as paperboards and food grade PVC sheets.

A folding method of inner packaging case paper of a triangular cigarette utilizes the described inner packaging case paper, and includes the following steps:

a, presetting a plurality of parallel crease lines on a triangular-cigarette first inner cavity partition board S1, and folding the triangular-cigarette first inner cavity partition board along the crease lines into a triangular-cigarette first triangular protrusion S11 and a triangular-cigarette first triangular groove S12 that are sequentially connected and have a cross section being a triangle;

b, presetting a plurality of parallel crease lines on a triangular-cigarette second inner cavity partition board S2, and folding the triangular-cigarette second inner cavity partition board along the crease lines into a triangular-cigarette second triangular protrusion S21 and a triangular-cigarette second triangular groove S22 that are sequentially connected and have a cross section being a triangle, wherein the triangular-cigarette second triangular groove S22 internally has a vertical triangular-cigarette spacer S23; and c, stacking the folded triangular-cigarette first inner cavity partition board S1 and triangular-cigarette second inner cavity partition board S2 in an obverse-reverse opposite mode, wherein the triangular-cigarette first triangular protrusion S11 of the triangular-cigarette first inner cavity partition board S1 on the upper layer is opposite to the triangular-cigarette second triangular groove S22 of the triangular-cigarette second inner cavity partition board S2 on the lower layer to be capable of forming a plurality of sequentially connected cigarette accommodating cavities with the cross section being a rhombus, and the vertical triangular-cigarette spacer S23 in the triangular-cigarette second triangular groove S22 is respectively connected to a triangular vertex of the triangular-cigarette first triangular protrusion S11 on the upper layer and a triangular vertex of the triangular-cigarette second triangular groove S22 on the lower layer, so as to divide the rhombic cigarette accommodating cavities into middle-layer triangular accommodating cavities on two sides of the vertical triangular-cigarette spacer S23.

Preferably, a distance between the plurality of longitudinal crease lines on the triangular-cigarette first inner cavity partition board S1 and the triangular-cigarette second inner cavity partition board S2 is equal, and the distance is root 2 of one half of a height of the triangular-cigarette spacer S23.

A cigarette case contains the inner packaging case paper described in the present invention, and the cigarette case further includes a triangular-cigarette case body S3. An inner packaging case formed by folding from the inner packaging case paper is located in the triangular-cigarette case body S3, and a cigarette accommodating cavity generates fixing and extruding effects on the cigarettes, so that circular cigarettes become triangles and are accommodated in the cigarette accommodating cavity.

The cigarette case is a conventional flip type manual cigarette packaging case.

Inner Packaging Case Paper of a Hexagonal Cigarette:

the packaging case paper includes at least two layers of hexagonal-cigarette inner cavity partition boards L1, the hexagonal-cigarette inner cavity partition boards L1 are provided with hexagonal-cigarette crease lines L13 in advance, and are folded along the crease lines into a hexagonal-cigarette trapezoidal protrusion L11 and a hexagonal-cigarette trapezoidal groove L12 that are sequentially connected and have a cross section being a trapezoid, the hexagonal-cigarette trapezoidal protrusion L11 and the hexagonal-cigarette trapezoidal groove L12 have the same size and shape, the folded two layers of hexagonal-cigarette inner cavity partition boards L1 are stacked in an obverse-reverse opposite mode, the hexagonal-cigarette trapezoidal protrusion L11 of the hexagonal-cigarette inner cavity partition board L1 on an upper layer is opposite to the hexagonal-cigarette trapezoidal groove L12 of the hexagonal-cigarette inner cavity partition board L1 on a lower layer to be capable of forming a plurality of sequentially connected cigarette accommodating cavities with cross sections being hexagons, and the cigarette accommodating cavities generate fixing and extruding effects on cigarettes to cause cross sections of the cigarettes to become hexagons and the cigarettes be accommodated in the cigarette accommodating cavities. In order to achieve the effect of extruding the cigarettes, a diameter of an inscribed circle of a cavity accommodating the independent cigarette is less than a diameter of the cigarette, that is, a diameter of an inscribed circle of the cigarette accommodating cavity with the cross section being the hexagon is less than the diameter of the cigarette.

Preferably, upper edges and two waists of the hexagonal-cigarette trapezoidal protrusion L11 and the hexagonal-cigarette trapezoidal groove L12 are equal to be capable of forming a plurality of sequentially connected cigarette accommodating cavities with cross sections being regular hexagons.

Preferably, the hexagonal-cigarette trapezoidal protrusion L11 and the hexagonal-cigarette trapezoidal groove L12 are sequentially connected end to end.

Preferably, the seven regular hexagons are provided.

Preferably, materials of the hexagonal-cigarette inner cavity partition boards L1 are paperboards or food grade PVC sheets.

Materials of the hexagonal-cigarette inner cavity partition boards L1 are preferably materials with good stiffness and strong support, such as paperboards and food grade PVC sheets.

A folding method of the inner packaging case paper described in the present invention includes the following steps:

a, having a plurality of longitudinal crease lines on hexagonal-cigarette inner cavity partition boards L1, and folding the hexagonal-cigarette inner cavity partition boards L1 along the crease lines repeatedly for multiple times into a hexagonal-cigarette trapezoidal protrusion L11 and a hexagonal-cigarette trapezoidal groove L12 that are sequentially connected and have a cross section being the trapezoid; and b, stacking the folded hexagonal-cigarette inner cavity partition boards L1 in an obverse-reverse opposite mode, so that the hexagonal-cigarette trapezoidal protrusion L11 of the hexagonal-cigarette inner cavity partition board L1 on the upper layer is opposite to the hexagonal-cigarette trapezoidal groove L12 of the hexagonal-cigarette inner cavity partition board L1 on the lower layer to constitute the plurality of sequentially connected cigarette accommodating cavities with the cross sections being the hexagons.

Preferably, a distance between the plurality of longitudinal crease lines on the hexagonal-cigarette inner cavity partition boards L1 is equal, so that the upper edges and two waists of the folded hexagonal-cigarette trapezoidal protrusion L11 and hexagonal-cigarette trapezoidal groove L12 with cross sections being trapezoids are equal to be capable of forming the plurality of sequentially connected cigarette accommodating cavities with cross sections being the regular hexagons.

A cigarette case contains the inner packaging case paper described in the present invention, and the cigarette case further includes a hexagonal-cigarette case body L2. An inner packaging case formed by folding from the inner packaging case paper is located in the hexagonal-cigarette case body L2, and a cigarette accommodating cavity generates fixing and extruding effects on the cigarettes, so that cigarettes become hexagons and are accommodated in the cigarette accommodating cavity.

The cigarette case is a conventional flip type manual cigarette packaging case.

Preferably, four layers of hexagonal-cigarette inner cavity partition boards L1 are provided, and the folded four layers of hexagonal-cigarette inner cavity partition boards L1 are stacked in an obverse-reverse opposite mode to form an upper-layer cigarette accommodating cavity, a middle-layer cigarette accommodating cavity, and a lower-layer cigarette accommodating cavity.

Preferably, the upper-layer cigarette accommodating cavity and the lower-layer cigarette accommodating cavity include seven sequentially connected hexagonal cavities, while the middle-layer cigarette accommodating cavity includes six sequentially connected hexagonal cavities.

The square-cigarette filling and compressing positioning sleeve, the square-cigarette middle layer spacing sleeve, the square-cigarette partition board, the square-circular-cigarette filling and compressing positioning sleeve, the square-circular-cigarette inner cavity fixing sleeve, the square-circular-cigarette middle layer fixing sleeve, the triangular-cigarette first inner cavity partition board, the triangular-cigarette second inner cavity partition board, S23-triangular-cigarette spacer, and the hexagonal-cigarette inner cavity partition board of the present invention all adopt the materials such as paperboards and food grade PVC sheets. The specific manufacturing method is as follows:

1, determining, according to needs, specifications of a cigarette needing to be manufactured and a style of a selected packaging case, determining structural dimensions of the above components, and ensuring that the dimension of each component matches the selected cigarette packaging case; and 2, drawing structural drawings of the inner cavity partition board, and using a cutting and proofing machine in conjunction with a manual operation to cut and perform die pressing on the preferred materials such as the paperboards and the food grade PVC sheets to manufacture the desired style.

The batch machining problem of the above components is solved by using printing and die-cutting methods.

The conventional circular cigarettes produced in large production are put between the above formed components according to the previously determined arrangement mode and placed in the packaging case, and are changed into a shape of the special-shaped cigarette that needing to be manufactured through a pressure in a packaging case forming process. Forming is performed, and multiple batches of testing and use are performed.

The present invention has the following advantages compared to the prior art:

1. The present invention provides different inner packaging case paper designs for different special-shaped cigarettes. By designing and cutting the packaging case paper, the cigarette filling and compressing positioning sleeve and the middle layer spacing sleeve with the specific shapes are designed. By folding, the conventional circular cigarettes are put into the cigarette case made of the inner packaging case paper of the special-shaped cigarettes, and the cigarettes are limited in the cavity body with a specific shape and size to generate fixing and extruding effects on the cigarettes, so that the conventional circular cigarettes are changed into the special-shaped cigarettes and can be put into the packaging case (the square cavity) with an existing specification without the need for redesigning the case structure, and problems such as high cost and a cumbersome step caused by directly producing the special-shaped cigarettes through mechanical equipment in the prior art are avoided.

2. The present invention provides various inner packaging case paper of the special-shaped cigarettes without the need for newly adding cigarette production equipment or redesigning the cigarette case structure. The cost is low, the shapes of the cigarettes can be changed by simply using the newly designed inner packaging case paper of the special-shaped cigarettes and its folding method, and outer packaging requirements of the special-shaped cigarettes are met. The cigarette filling and compressing positioning sleeve and the middle layer spacing sleeve both adopt the materials with good stiffness and strong support, so that the cigarettes are convenient to store, and stable in position during transportation, and are not subjected to wrinkles or deformation due to mutual extrusion. The stacking and extrusion of the packaging cases can make the formation of the cigarettes more stable, and the shapes are not prone to being changed, so as to avoid inconvenience of storage and transportation caused by placing the pre-prepared special-shaped cigarettes in the conventional cigarette packaging case in the prior art, and also avoid the need to separately prepare a special-shaped cigarette packaging case that matches the special-shaped cigarette. In addition, bump during transportation is more conducive to the transformation of cigarette formation.

3. The present invention provides consumers with the new folding method of the inner packaging case paper of the special-shaped cigarette, meeting the public's desire for novelty in new things. The use experience of the consumers is optimized through the movable and foldable cigarette positioning partition board sleeve structure, taking of the cigarette is facilitated, and consumers' sense of trust and satisfaction with the brand can be better cultivated. In the future, it can be continued to be developed and used for advertising and commercial promotion. The development of more products, functions, and applications in the subsequent is achieved, and the objectives of development and promotion are achieved by continuously optimizing the experience.

DESCRIPTION OF REFERENCE SIGNS IN ACCOMPANYING DRAWINGS

In FIG. 1 to FIG. 8: F1-Square-cigarette filling and compressing positioning sleeve, F11-Square-cigarette first folding baffle, F12-Square-cigarette second folding baffle, F13-Square-cigarette third folding baffle, F14-Square-cigarette fourth folding baffle, F15-Square-cigarette fifth folding baffle, F151-Square-cigarette first pre-notch, F16-Square-cigarette sixth folding baffle, F161-Square-cigarette pull buckle, F17-Square-cigarette first folding lug, F171-Square-cigarette first pin, F18-Square-cigarette second folding lug, F19-Square-cigarette third folding lug, F2-Square-cigarette middle layer spacing sleeve, F21-Square-cigarette seventh folding baffle, F22-Square-cigarette eighth folding baffle, F221-Square-cigarette second pre-notch, F23-Square-cigarette tenth folding baffle, F231-Square-cigarette second pin, F24-Square-cigarette ninth folding baffle, F3-Square-cigarette case body, F4-Square-cigarette partition board, F41-Square-cigarette plate main body, F42-Square-cigarette vertical spacer, and F5-Square cigarette.

In FIG. 9 to FIG. 15: FY1-Square-circular-cigarette filling and compressing positioning sleeve, FY11-Square-circular-cigarette first folding baffle, FY12-Square-circular-cigarette second folding baffle, FY13-Square-circular-cigarette third folding baffle, FY14-Square-circular-cigarette fourth folding baffle, FY15-Square-circular-cigarette fifth folding baffle, FY16-Square-circular-cigarette sixth folding baffle, FY161-Square-circular-cigarette pull buckle, FY17-Square-circular-cigarette first folding lug, FY171-Square-circular-cigarette first pin, FY18-Square-circular-cigarette second folding lug, FY19-Square-circular-cigarette third folding lug, FY2-Square-circular-cigarette inner cavity fixing sleeve, FY21-Square-circular-cigarette first side plate, FY22-Square-circular-cigarette second side plate, FY23-Square-circular-cigarette third side plate, FY231-Square-circular-cigarette side wing, FY3-Square-circular-cigarette middle layer fixing sleeve, FY31-Square-circular-cigarette fourth side plate, FY32-Square-circular-cigarette fifth side plate, FY33-Square-circular-cigarette sixth side plate, FY341-Square-circular-cigarette trapezoidal protrusion, FY4-Square-circular-cigarette partition board, FY41-Square-circular-cigarette plate main body, FY42-Square-circular-cigarette vertical spacer, FY5-Square-circular-cigarette trapezoidal groove, FY51-Square-circular-cigarette triangular prism, FY6-Square-circular-cigarette case body, and FY7-Square circular cigarette.

In FIG. 16 to FIG. 19: S1-Triangular-cigarette first inner cavity partition board, S11-Triangular-cigarette first triangular protrusion, S12-Triangular-cigarette first triangular groove, S2-Triangular-cigarette second inner cavity partition board, S21-Triangular-cigarette first triangular protrusion, S22-Triangular-cigarette first triangular groove, S23-Triangular-cigarette spacer, S3-Triangular-cigarette case body, and S4-Triangular cigarette.

Figure 20:
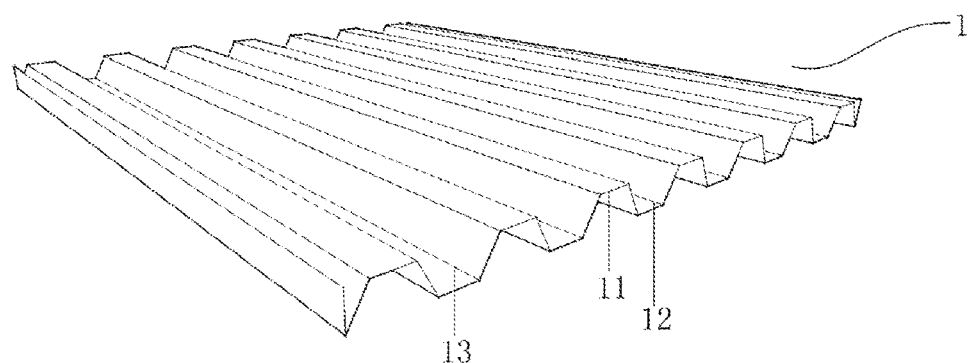
FIG. 20 is a schematic structural diagram of a hexagonal-cigarette inner cavity partition board L1 after folding of the present invention.
Figure 21:
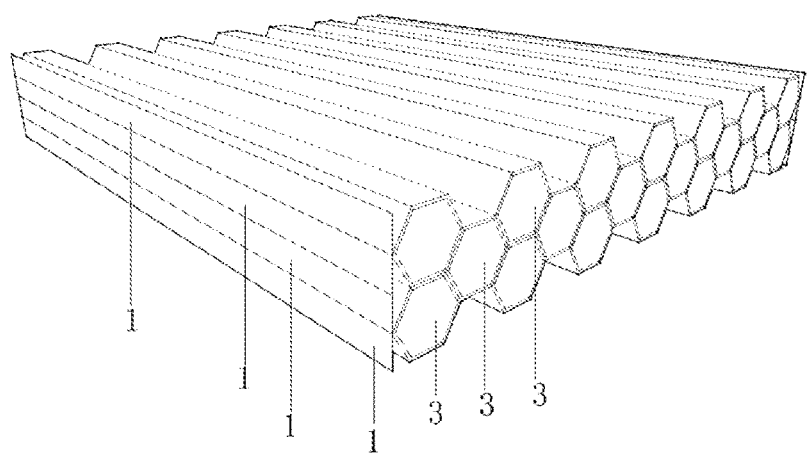
FIG. 21 is a schematic structural diagram of four layers of hexagonal-cigarette inner cavity partition boards L1 after repeated accumulation and stacking of cigarettes of the present invention.
Figure 22:
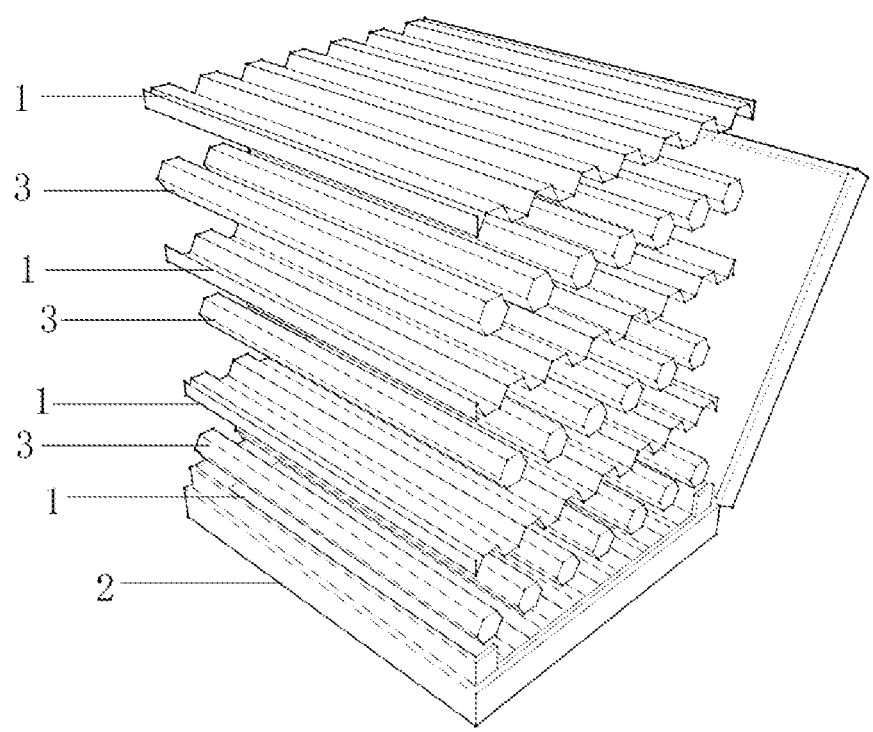
FIG. 22 is a schematic diagram of a process of putting a cigarette and a hexagonal-cigarette inner cavity partition board L1 into a cigarette case of the present invention.

In FIG. 20-FIG. 22: L1-Hexagonal-cigarette inner cavity partition board, L11-Hexagonal-cigarette trapezoidal protrusion, L12-Hexagonal-cigarette trapezoidal groove, L14-Hexagonal-cigarette crease line, L2-Hexagonal-cigarette case body, and L3-Hexagonal cigarette.

DETAILED DESCRIPTION OF THE EMBODIMENTS

In order to better understand the objective, structure, and function of the present invention, the following will provide a further detailed description of inner packaging case paper of a special-shaped cigarette, a folding method thereof, and a cigarette case containing the same of the present invention, with reference to the accompanying drawings.

Embodiment 1

As shown in FIG. 1 to FIG. 8, inner packaging case paper of a square cigarette includes a square-cigarette filling and compressing positioning sleeve F1, a square-cigarette middle layer spacing sleeve F2, and a square-cigarette partition board F4.

The square-cigarette filling and compressing positioning sleeve F1 includes a square-cigarette first folding baffle F11, a square-cigarette second folding baffle F12, a square-cigarette third folding baffle F13, a square-cigarette fourth folding baffle F14, a square-cigarette fifth folding baffle F15, and a square-cigarette sixth folding baffle F16, and the square-cigarette filling and compressing positioning sleeve F1 is capable of being folded into a first cuboid; and the square-cigarette second folding baffle F12, the square-cigarette third folding baffle F13, the square-cigarette fourth folding baffle F14, and the square-cigarette sixth folding baffle F16 are sequentially connected with four edges of the square-cigarette first folding baffle F11 to serve as four side surfaces of the first cuboid, the square-cigarette first folding baffle F11 serves as a bottom surface of the first cuboid, and the square-cigarette fifth folding baffle F15 serves as a top surface of the first cuboid.

The square-cigarette third folding baffle F13 and the square-cigarette second folding baffle F12 have the same size and shape, and respectively located on left and right sides of the square-cigarette first folding baffle F11, two square-cigarette first folding lugs F17 are respectively connected to one end of the square-cigarette second folding baffle F12 far away from the square-cigarette first folding baffle F11 and one end of the square-cigarette third folding baffle F13 far away from the square-cigarette first folding baffle F11, and one end of each square-cigarette first folding lug F17 far away from the square-cigarette first folding baffle F11 has a square-cigarette first pin F171.

The square-cigarette fourth folding baffle F14 and the square-cigarette sixth folding baffle F16 are respectively located on upper and lower sides of the square-cigarette first folding baffle F11, one end of the square-cigarette fourth folding baffle F14 far away from the square-cigarette first folding baffle F11 is connected with the square-cigarette fifth folding baffle F15, and the square-cigarette fifth folding baffle F15 is provided with a square-cigarette first pre-notch F151 corresponding to the square-cigarette first pins F171.

A square-cigarette second folding lug F18 and a square-cigarette third folding lug F19 are sequentially connected to one end of the square-cigarette sixth folding baffle F16 far away from the square-cigarette first folding baffle F11, a connection part of the square-cigarette sixth folding baffle F16 and the square-cigarette second folding lug F18 is provided with a square-cigarette pull buckle F161, and the square-cigarette second folding lug F18 and the square-cigarette third folding lug F19 are capable of being inserted into the first cuboid from the top surface of the first cuboid.

The square-cigarette second folding lug F18 and the square-cigarette third folding lug F19 are capable of being pulled out of the first cuboid by pulling the square-cigarette pull buckle F161 by hand, making it convenient for a consumer to take out the cigarette.

The square-cigarette middle layer spacing sleeve F2 includes a square-cigarette seventh folding baffle F21, a square-cigarette eighth folding baffle F22, and a square-cigarette ninth folding baffle F24, and the square-cigarette middle layer spacing sleeve F2 is capable of being folded into a second cuboid with an opening in a side surface; and the square-cigarette seventh folding baffle F21 serves as a top surface of the second cuboid, the square-cigarette eighth folding baffle F22 serves as a bottom surface of the second cuboid, and the square-cigarette seventh folding baffle F21 is connected with the square-cigarette eighth folding baffle F22 through the square-cigarette ninth folding baffle F24.

The square-cigarette eighth folding baffle F22 has a square second pre-notch F221, left and right sides of the square-cigarette eighth folding baffle F22 extend outwards to have a square tenth folding baffle F23, one end of the square tenth folding baffle F23 far away from the square-cigarette eighth folding baffle F22 has a second pin F231, the square tenth folding baffle F23 is provided with a crease line, by overturning and folding along the crease line, the second pin F231 is capable of being inserted into the square second pre-notch F221, and the square tenth folding baffle F23 forms a third cuboid with a cavity structure on the left and right sides of the square-cigarette eighth folding baffle F22.

The second cuboid is inserted into the first cuboid, a top and bottom of the second cuboid form a fourth cuboid cavity with a top and bottom of the first cuboid respectively, and an inner cavity of the second cuboid and the fourth cuboid cavity limit shapes and sizes of the cigarettes so as to generate fixing and extruding effects on the cigarettes.

The square-cigarette partition board F4 includes a square plate main body F41 and a plurality of square-cigarette vertical spacers F42 perpendicular to the square plate main body F41 and erected on the square plate main body F41, each square-cigarette vertical spacer F42 is inserted into a gap between the adjacent cigarettes so as to generate the fixing and extruding effects on the cigarettes on two sides of the square-cigarette vertical spacer F42.

Circular cigarettes in the second cuboid and the fourth cuboid are changed into square cigarettes under three kinds of fixing and extruding of the square-cigarette filling and compressing positioning sleeve F1, the square-cigarette middle layer spacing sleeve F2, and the square-cigarette partition board F4.

Each layer of cigarettes is provided with the independent square-cigarette partition board F4, and the quantity of the square-cigarette vertical spacers F42 is equal to the quantity of cigarettes in each layer minus one, that is, the quantity of the square-cigarette vertical spacers F42 is equal to the quantity of gaps between the cigarettes in each layer. In the present embodiment, the upper layer and the lower layer each have seven cigarettes 5, the partition board used for the upper layer and the lower layer has six vertical spacers, while the middle layer has six cigarettes 5, and the partition board used for the middle layer has five vertical spacers. Each vertical spacer is located in a gap between the adjacent cigarettes.

A distance between the adjacent square-cigarette vertical spacers F42 is less than the diameter of the cigarette.

Two square-cigarette first pre-notches F151 are provided, and two square-cigarette first pins F171 corresponding to the square-cigarette first pre-notches are also provided. Four square second pre-notches F221 are provided, and four second pins F231 corresponding to the square second pre-notches are also provided.

Materials of the square-cigarette filling and compressing positioning sleeve F1, the square-cigarette middle layer spacing sleeve F2, and the square-cigarette partition board F4 are selected from food grade PVC sheets.

A folding method of inner packaging case paper of a square cigarette:

the method includes the following steps:

a square-cigarette middle layer spacing sleeve F2 is folded into a second cuboid with an opening in a side surface:

a, a square tenth folding baffle F23 is overturned and folded along crease lines towards a square-cigarette eighth folding baffle F22, and second pins F231 of the square tenth folding baffle F23 are inserted into square second pre-notches F221, so that the square tenth folding baffle forms a third cuboid with a cavity structure on left and right sides of the square-cigarette eighth folding baffle F22; and b, a square-cigarette seventh folding baffle F21 and a square-cigarette ninth folding baffle F24 are overturned and folded towards the square-cigarette eighth folding baffle F22 through the crease lines, so that the square-cigarette seventh folding baffle F21 is relatively parallel to the square-cigarette eighth folding baffle F22, and the square-cigarette seventh folding baffle F21, the square-cigarette ninth folding baffle F24, the square-cigarette eighth folding baffle F22 and the third cuboid are combined into a second cuboid with an opening in a side surface;

a square-cigarette filling and compressing positioning sleeve F1 is folded into a first cuboid:

c, a square-cigarette second folding baffle F12, a square-cigarette third folding baffle F13, a square-cigarette fourth folding baffle F14, and a square-cigarette sixth folding baffle F16 of the square-cigarette filling and compressing positioning sleeve F1 are folded inwards along an edge adjacent to a square-cigarette first folding baffle F11, so that the square-cigarette second folding baffle F12 is relatively parallel to the square-cigarette third folding baffle F13, and the square-cigarette fourth folding baffle F14 is perpendicular to the square-cigarette first folding baffle F11;

d, a square-cigarette fifth folding baffle F15 is folded towards the square-cigarette first folding baffle F11 along an edge adjacent to the square-cigarette fourth folding baffle F14, so that the square-cigarette fifth folding baffle F15 is relatively parallel to the square-cigarette first folding baffle F11;

e, a square-cigarette first folding lug F17 is folded along an edge adjacent to the square-cigarette second folding baffle F12 and the square-cigarette third folding baffle F13, so that square-cigarette first pins F171 of the square-cigarette first folding lug F17 are inserted into square-cigarette first pre-notches F151 corresponding to the square-cigarette fifth folding baffle F15; and f, a square-cigarette second folding lug F18 and a square-cigarette third folding lug F19 on a top of the square-cigarette sixth folding baffle F16 are folded to be inserted into the first cuboid from a top surface of the first cuboid through the square-cigarette filling and compressing positioning sleeve F1; and the square-cigarette partition board F4 is provided, and does not require folding.

A cigarette case of inner packaging case paper of a square cigarette:

the cigarette case further includes a square case body F3, a square-cigarette middle layer spacing sleeve F2 is located in a square-cigarette filling and compressing positioning sleeve F1, and the square-cigarette filling and compressing positioning sleeve F1 is located in the square case body F3;

the square case body F3 internally has a cigarette accommodating cavity;

the cigarette accommodating cavity is divided into an upper layer, a middle layer and a lower layer, the upper layer and the lower layer are fourth cuboid cavities, the middle layer is a second cuboid inner cavity, and each layer of cigarettes is internally provided with an independent square-cigarette partition board F4; and circular cigarettes in a second cuboid and a fourth cuboid are changed into square cigarettes under three kinds of fixing and extruding of the square-cigarette filling and compressing positioning sleeve F1, the square-cigarette middle layer spacing sleeve F2, and the square-cigarette partition board F4.

The upper layer and the lower layer each have seven cigarettes, the square-cigarette partition board F4 correspondingly used for the upper layer and the lower layer has six square-cigarette vertical spacers F42, while the middle layer has six cigarettes, and the partition board correspondingly used for the middle layer has five square-cigarette vertical spacers F42. Each square-cigarette vertical spacer F42 is located in a gap between the adjacent cigarettes. The square case body F3 is a conventional cigarette packaging case.

Embodiment 2

As shown in FIG. 9 to FIG. 15, inner packaging case paper of a square-circle combined cigarette is provided. The square-circle combined cigarette has a cross section at one end being a circle and a cross section at the other end being a square; and the inner packaging case paper includes a square-circular-cigarette filling and compressing positioning sleeve FY1, a square-circular-cigarette inner cavity fixing sleeve FY2, a square-circular-cigarette middle layer fixing sleeve FY3, and a square-circular-cigarette partition board FY4.

The square-circular-cigarette filling and compressing positioning sleeve FY1 is the same as the square-cigarette filling and compressing positioning sleeve F1 in embodiment 1.

The square-circular-cigarette inner cavity fixing sleeve FY2 includes a square-circular-cigarette first side plate FY21, left and right sides of the square-circular-cigarette first side plate FY21 are respectively connected with square-circular-cigarette second side plates FY22, one end of each square-circular-cigarette second side plate FY22 far away from the square-circular-cigarette first side plate FY21 is connected with a square-circular-cigarette third side plate FY23, and upper and lower edges of the square-circular-cigarette third side plate FY23 have square-circular-cigarette side wings FY231.

The square-circular-cigarette second side plate FY22 and the square-circular-cigarette third side plate FY23 are folded towards a side of the square-circular-cigarette first side plate FY21, and the square-circular-cigarette side wings FY231 are folded towards a side of the square-circular-cigarette second side plate FY22 to be capable of forming a squarecircular-cigarette trapezoidal groove FY5, the square-circular-cigarette first side plate FY21 is a plane where an upper bottom of the square-circular-cigarette trapezoidal groove FY5 is located, the square-circular-cigarette third side plate FY23 is a plane where a waist of the square-circular-cigarette trapezoidal groove FY5 is located, and the square-circular-cigarette second side plate FY22 is perpendicular to the square-circular-cigarette first side plate FY21 and is located on an outer side of the square-circular-cigarette third side plate FY23; and the square-circular-cigarette second side plate FY22, the square-circular-cigarette third side plate FY23 and the square-circular-cigarette side wings FY231 are folded to form a square-circular-cigarette triangular prism FY51, and a bottom surface of the square-circular-cigarette triangular prism FY51 is located on the square-circular-cigarette first side plate FY21, so as to define the plane where the upper bottom of the square-circular-cigarette trapezoidal groove FY5 is located.

The square-circular-cigarette middle layer fixing sleeve FY3 includes two square-circular-cigarette fourth side plates FY31, two square-circular-cigarette fifth side plates FY32, two square-circular-cigarette sixth side plates FY33, and one square-circular-cigarette seventh side plate FY34.

The square-circular-cigarette sixth side plates FY33 and the square-circular-cigarette fifth side plate FY32 are located on two sides of the square-circular-cigarette fourth side plate FY31, and the square-circular-cigarette seventh side plate FY34 is located between the two square-circular-cigarette sixth side plates FY33; and the square-circular-cigarette fifth side plates FY32 and the square-circular-cigarette sixth side plates FY33 are consistent in size and shape.

The square-circular-cigarette seventh side plate FY34 is a first isosceles trapezoid, one side close to the square-circular-cigarette fourth side plates FY31 is a bottom of the first isosceles trapezoid, the square-circular-cigarette seventh side plate FY34 has a second isosceles trapezoid crease line, similarly, one side close to the square-circular-cigarette fourth side plates FY31 is a bottom of the second isosceles trapezoid crease line, the square-circular-cigarette seventh side plates FY34 is capable of being folded to form a square-circular-cigarette trapezoidal protrusion FY341 by folding along the second isosceles trapezoid crease line, and a trapezoidal notch corresponding to the square-circular-cigarette seventh side plate FY34 is formed between the two square-circular-cigarette fifth side plates FY32.

The square-circular-cigarette fifth side plates FY32 are folded towards a direction of the square-circular-cigarette sixth side plates FY33 through the square-circular-cigarette fourth side plates FY31, the square-circular-cigarette fifth side plates FY32 are relatively parallel to the square-circular-cigarette sixth side plates FY33 to be capable of forming two right-angle grooves, and the square-circular-cigarette trapezoidal protrusion FY341 is located between the two right-angle grooves.

The right-angle grooves are inserted in the square-circular-cigarette trapezoidal groove FY5, the square-circular-cigarette trapezoidal groove FY5 is wrapped with a first cuboid to form an upper layer, a middle layer and a lower layer, and the right-angle grooves are the middle layer.

The square-circular-cigarette partition board FY4 includes a square-circular-cigarette plate main body FY41 and a plurality of square-circular-cigarette vertical spacers FY42 perpendicular to the square-circular-cigarette plate main body FY41 and erected on the square-circular-cigarette plate main body FY41, each square-circular-cigarette vertical spacer FY42 is inserted into a gap between the adjacent cigarettes so as to generate fixing and extruding effects on cigarettes on two sides of the square-circular-cigarette vertical spacer FY42.

Circular cigarettes in the square-circular-cigarette trapezoidal groove FY5 are changed into cigarettes with one ends being square and the other ends being circular under four kinds of fixing and extruding of the square-circular-cigarette filling and compressing positioning sleeve FY1, the square-circular-cigarette inner cavity fixing sleeve FY2, the square-circular-cigarette middle layer fixing sleeve FY3, and the square-circular-cigarette partition board FY4.

Each layer of cigarettes is provided with the independent square-circular-cigarette partition board FY4, and the quantity of the square-circular-cigarette vertical spacers FY42 is equal to the quantity of cigarettes in each layer minus one. That is, the quantity of the square-circular-cigarette vertical spacers FY42 is equal to the quantity of gaps between the cigarettes in each layer. In the present embodiment, the upper layer and the lower layer each have seven cigarettes 7, the partition board used for the upper layer and the lower layer has six vertical spacers, while the middle layer has six cigarettes 7, and the partition board used for the middle layer has five vertical spacers. Each vertical spacer is located in a gap between the adjacent cigarettes.

A distance between the adjacent square-circular-cigarette vertical spacers FY42 is less than the diameter of the cigarette.

Materials of the square-circular-cigarette filling and compressing positioning sleeve FY1, the square-circular-cigarette inner cavity fixing sleeve FY2, the square-circular-cigarette middle layer fixing sleeve FY3, and the square-circular-cigarette partition board FY4 are selected from food grade PVC sheets.

Figure 1:
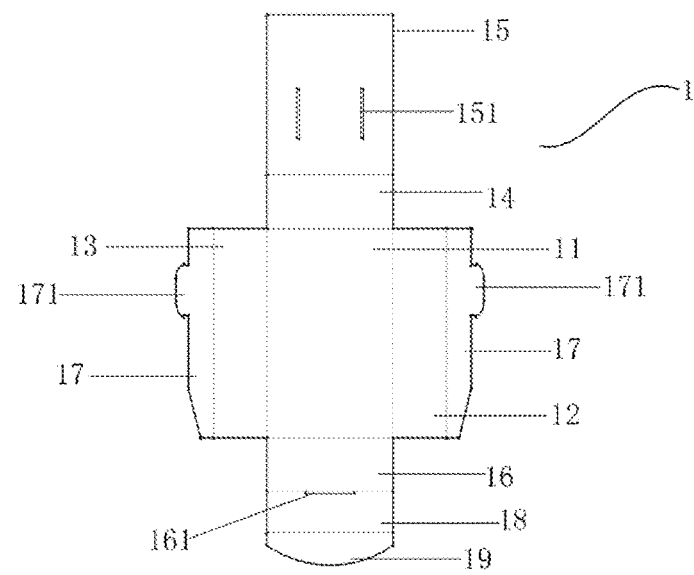
FIG. 1 is a schematic expansion diagram of a square-cigarette filling and compressing positioning sleeve F1 of the present invention.
Figure 2:
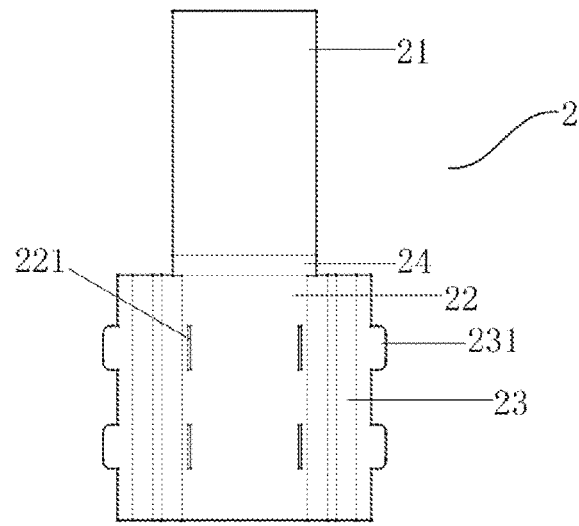
FIG. 2 is a schematic expansion diagram of a square-cigarette middle layer spacing sleeve F2 of the present invention.
Figure 3:
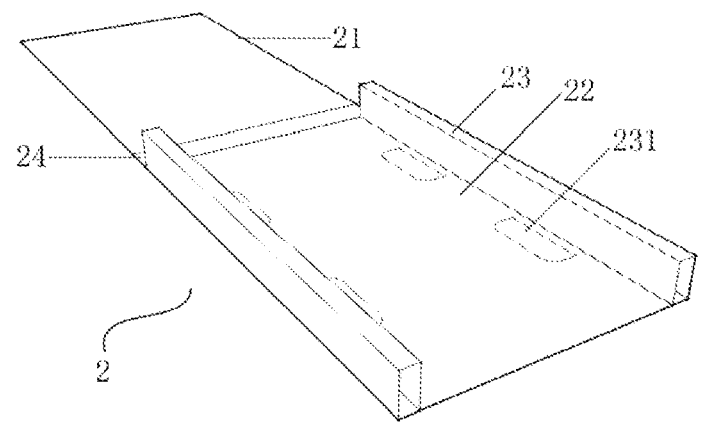
FIG. 3 is a schematic folding diagram of a square-cigarette middle layer spacing sleeve F2 of the present invention.
Figure 4:
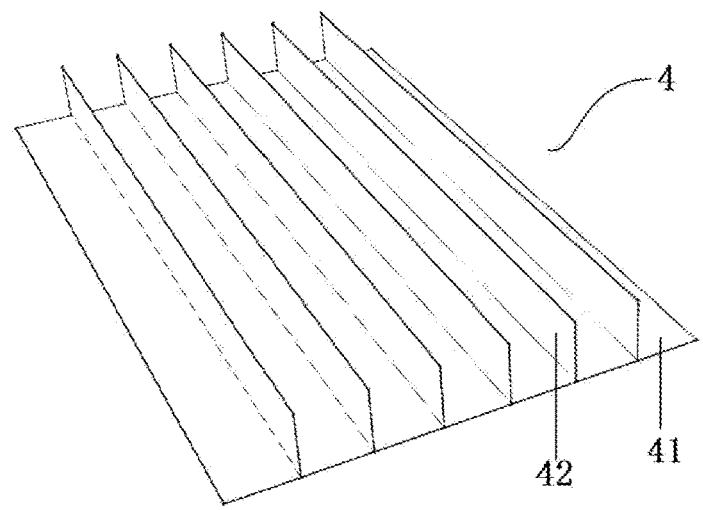
FIG. 4 is a schematic structural diagram of a square-cigarette partition board F4 used in an upper-layer cigarette accommodating cavity and a lower-layer cigarette accommodating cavity of the present invention. In order to match seven cigarettes, the square-cigarette partition board F4 has six square-cigarette vertical spacers.
Figure 5:
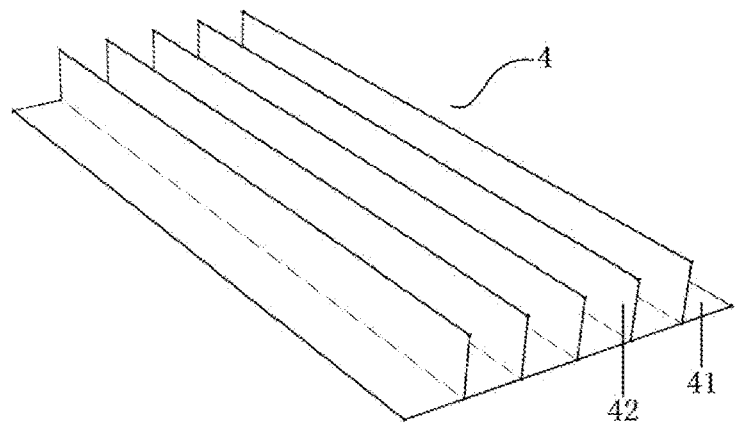
FIG. 5 is a schematic structural diagram of a square-cigarette partition board F4 used in a middle-layer cigarette accommodating cavity of the present invention. In order to match six cigarettes, the square-cigarette partition board F4 has five square-cigarette vertical spacers.
Figure 6:
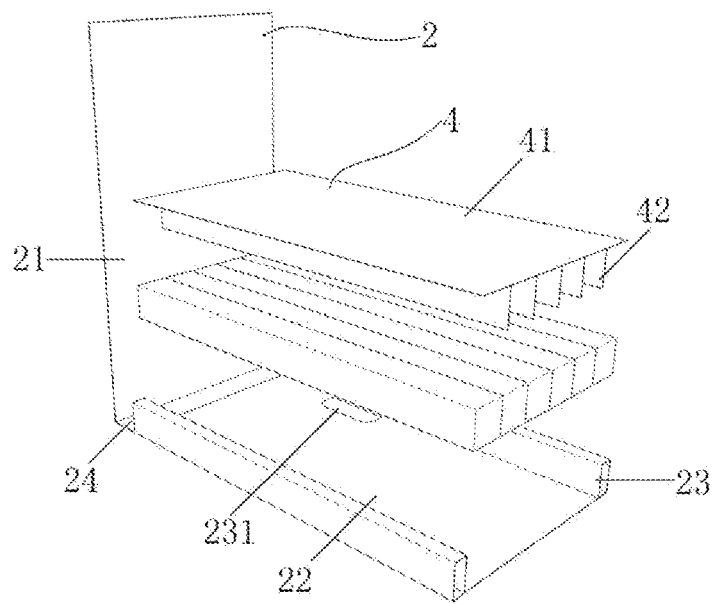
FIG. 6 is a schematic structural diagram of filling a folded square-cigarette middle layer spacing sleeve F2 with a middle-layer cigarette and a middle-layer square-cigarette partition board F4 of the present invention.
Figure 7:
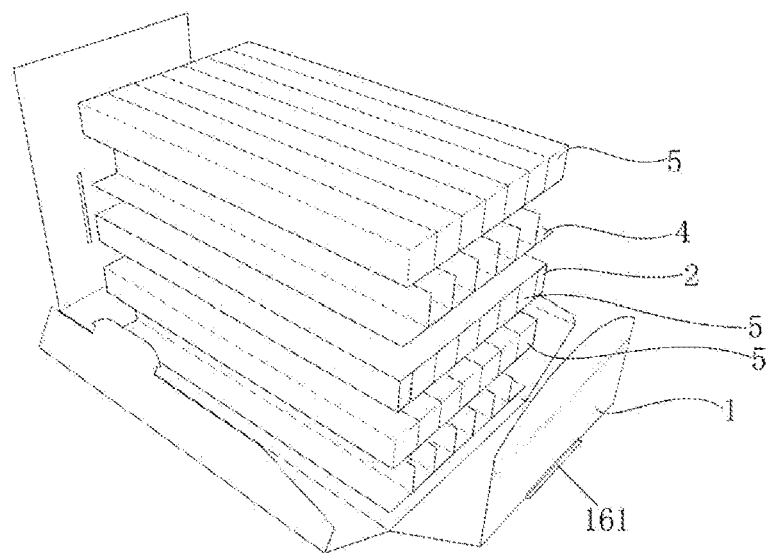
FIG. 7 is a schematic structural diagram of filling a folded square-cigarette filling and compressing positioning sleeve F1 with a three-layer cigarette and a three-layer square-cigarette partition board F4 of the present invention (wherein a middle layer is a square-cigarette middle layer spacing sleeve F2 filled with a cigarette in FIG. 5).
Figure 8:
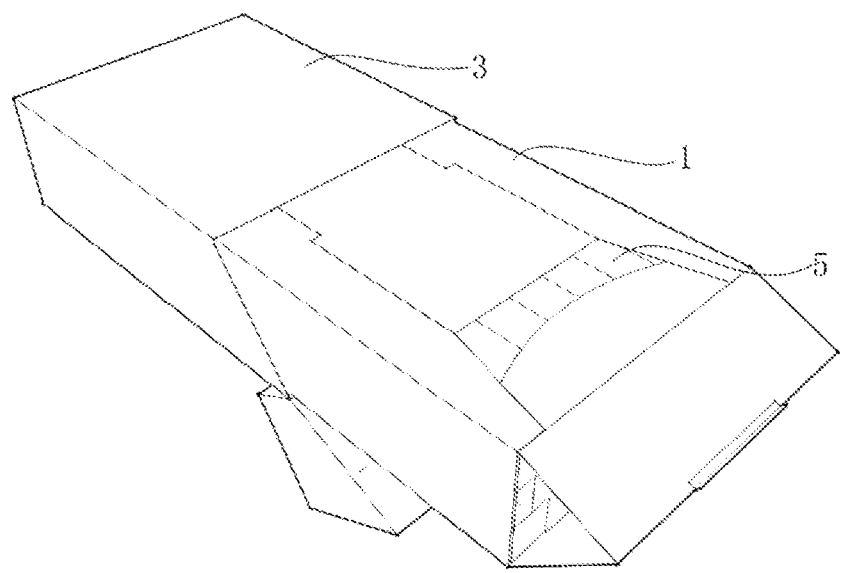
FIG. 8 is schematic structural diagram of putting a cigarette after being packaged through a filling and compressing positioning sleeve F1, a square-cigarette middle layer spacing sleeve F2 and a square-cigarette partition board F4 into a square case body F3 of the present invention.
Figure 9:
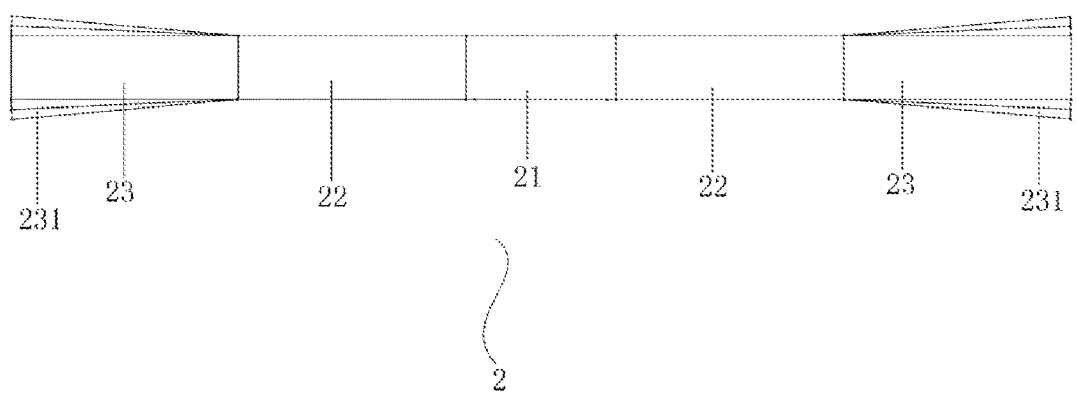
FIG. 9 is a schematic structural diagram of a square-circular-cigarette inner cavity fixing sleeve FY2 of the present invention.
Figure 10:
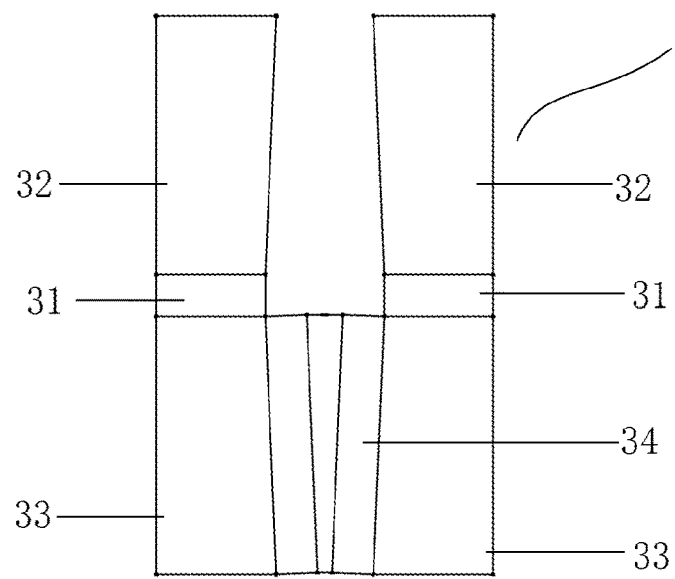
FIG. 10 is a schematic structural diagram of a square-circular-cigarette middle layer fixing sleeve FY3 of the present invention.
Figure 11:
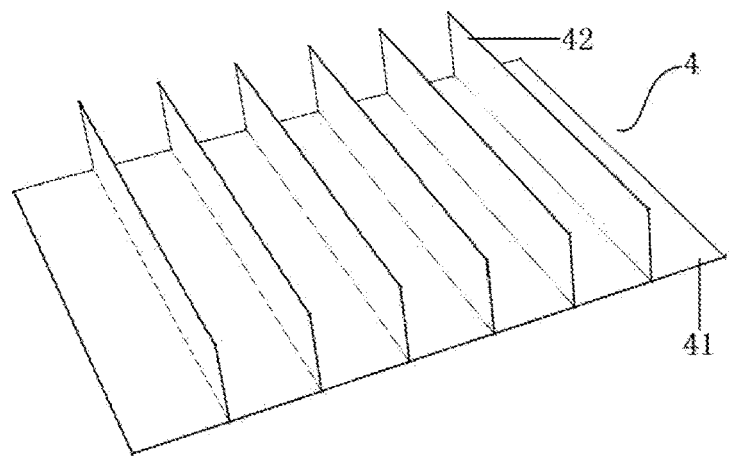
FIG. 11 is a schematic structural diagram of a square-circular-cigarette partition board FY4 used in an upper-layer cigarette accommodating cavity and a lower-layer cigarette accommodating cavity of the present invention. In order to match seven cigarettes, the square-circular-cigarette partition board FY4 has six square-circular-cigarette vertical spacers.
Figure 12:
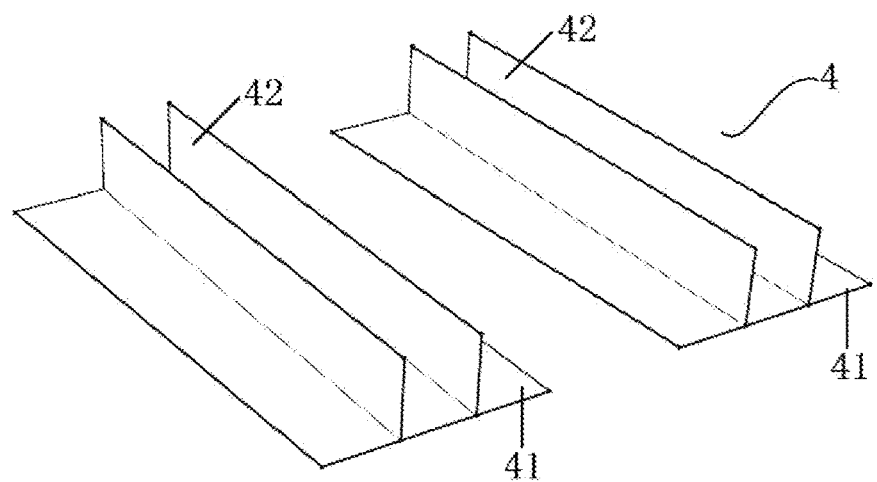
FIG. 12 is a schematic structural diagram of a square-circular-cigarette partition board FY4 used in a middle-layer cigarette accommodating cavity of the present invention, the two middle-layer square-circular-cigarette partition boards FY4 are provided, each has two square-circular-cigarette vertical spacers, the two square-circular-cigarette partition boards FY4 are respectively located on two sides of a square-circular-cigarette trapezoidal protrusion FY341, and each square-circular-cigarette partition board FY4 corresponds to three cigarettes.
Figure 13:
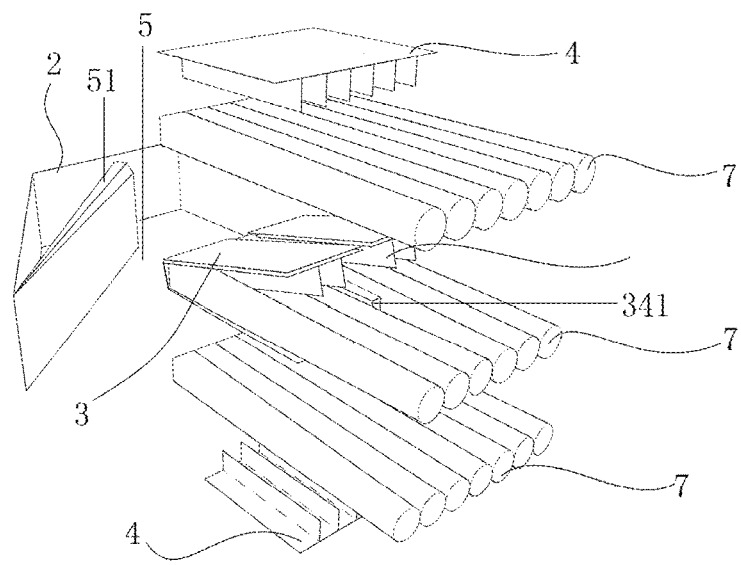
FIG. 13 is an exploded view of a square-circular-cigarette inner cavity fixing sleeve FY2, a square-circular-cigarette middle layer fixing sleeve FY3, a square-circular-cigarette partition board FY4, and cigarette filling of the present invention.
Figure 14:
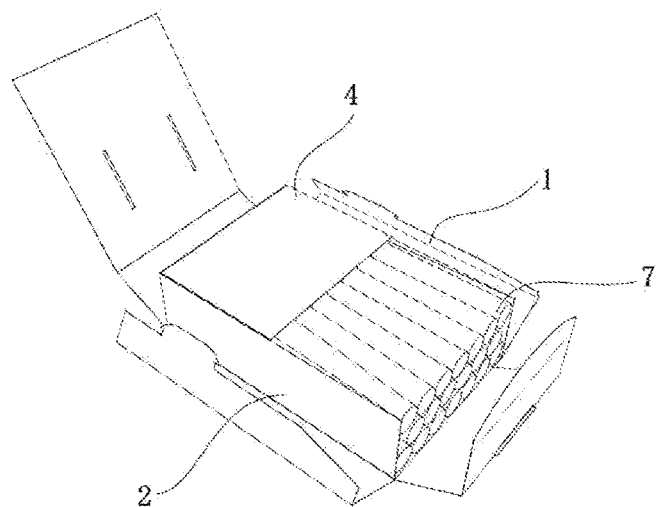
FIG. 14 is a schematic structural diagram of a square-circular-cigarette filling and compressing positioning sleeve FY1, a square-circular-cigarette inner cavity fixing sleeve FY2 and a square-circular-cigarette middle layer fixing sleeve FY3 of the present invention after being folded and filled with a cigarette.
Figure 15:
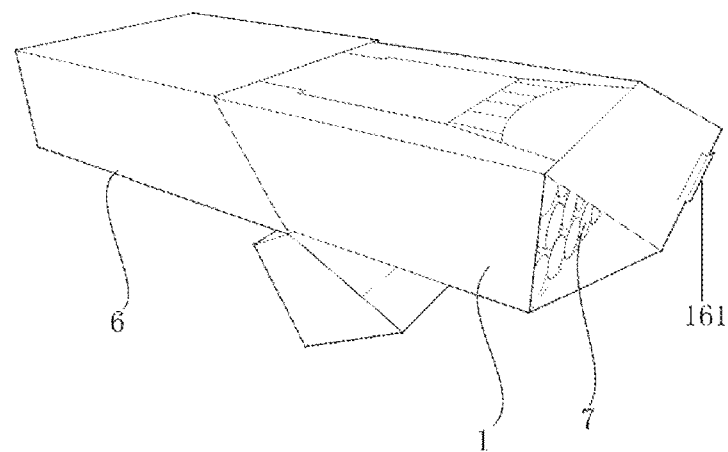
FIG. 15 is a schematic structural diagram of packaging a cigarette through a square-circular-cigarette filling and compressing positioning sleeve FY1, a square-circular-cigarette inner cavity fixing sleeve FY2, a square-circular-cigarette middle layer fixing sleeve FY3 and a square-circular-cigarette partition board FY4 and then putting the same into a square-circular-cigarette case body FY6 of the present invention.
Figure 16:
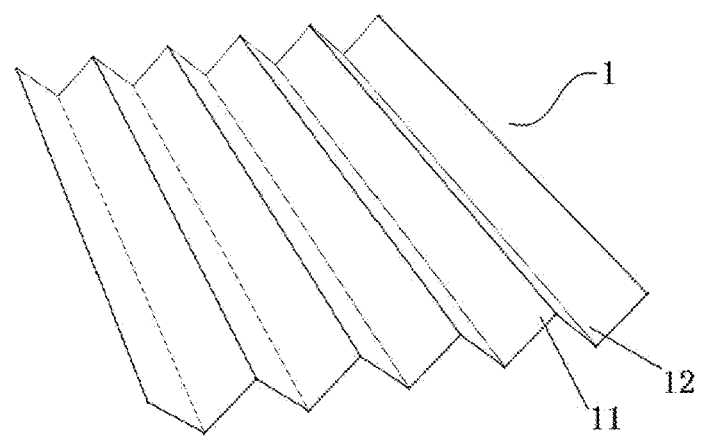
FIG. 16 is a schematic structural diagram of a triangular-cigarette first inner cavity partition board S1 after folding of the present invention.
Figure 17:
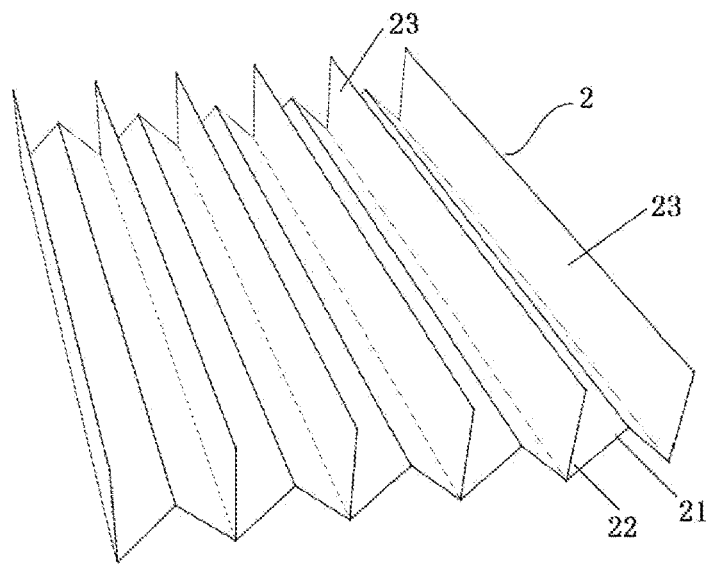
FIG. 17 is a schematic structural diagram of a triangular-cigarette second inner cavity partition board S2 after folding of the present invention.
Figure 18:
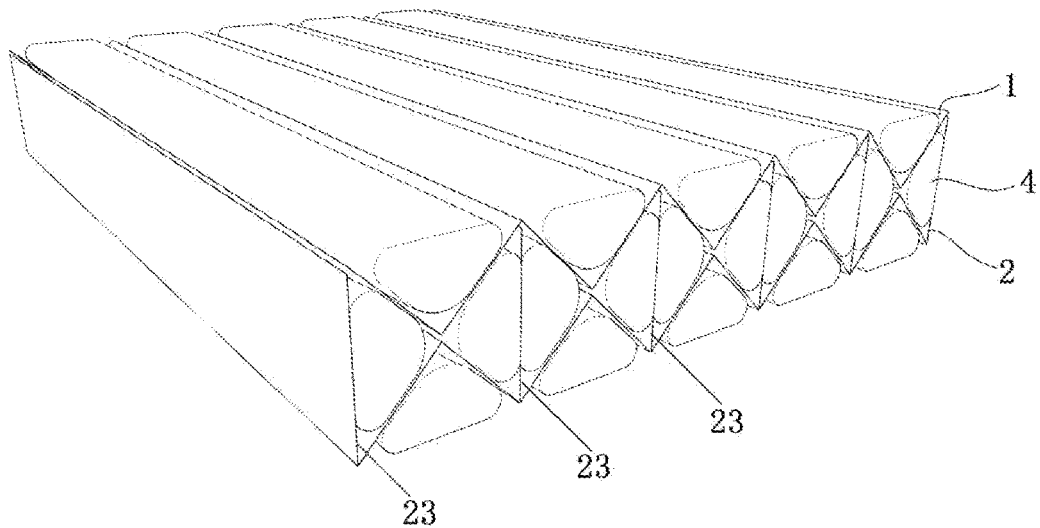
FIG. 18 is a cross-section view of a triangular-cigarette first inner cavity partition board S1 and a triangular-cigarette second inner cavity partition board S2 after stacking of cigarettes of the present invention.
Figure 19:
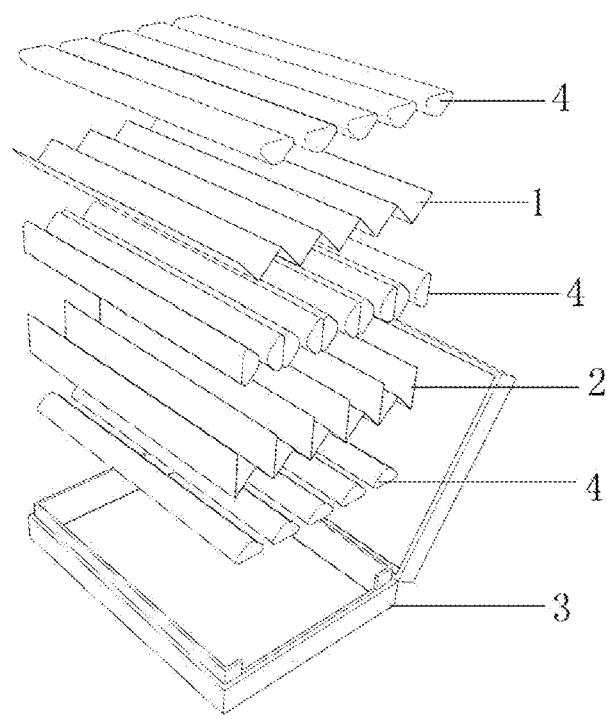
FIG. 19 is a schematic diagram of a process of putting a cigarette, a triangular-cigarette first inner cavity partition board S1 and a triangular-cigarette second inner cavity partition board S2 into a cigarette case of the present invention.

In the present embodiment, lengths of the square-circular-cigarette middle layer fixing sleeve FY3 and the square-circular-cigarette partition board FY4 are only half of an axial length of the cigarette, as shown in FIG. 5.

A folding method of inner packaging case paper of a square-circle combined cigarette utilizes the packaging case paper described in the first aspect of the present invention, and includes the following steps:

a material of a square-circular-cigarette filling and compressing positioning sleeve FY1 is selected from a paperboard or a food grade PVC sheet.

Materials of the square-circular-cigarette inner cavity fixing sleeve FY2 and the square-circular-cigarette middle layer fixing sleeve FY3 are selected from paperboards or food grade PVC sheets.

A folding method of the packaging case paper includes the following steps:

the square-circular-cigarette inner cavity fixing sleeve FY2 is folded into a trapezoidal groove;

a, a square-circular-cigarette second side plate FY22 and a square-circular-cigarette third side plate FY23 are folded towards a side of a square-circular-cigarette first side plate FY21, the square-circular-cigarette second side plate FY22 is perpendicular to the square-circular-cigarette first side plate FY21, square-circular-cigarette side wings FY231 are folded towards the square-circular-cigarette second side plate FY22 to be capable of forming a square-circular-cigarette trapezoidal groove FY5, the square-circular-cigarette first side plate FY21 is a plane where an upper bottom of the square-circular-cigarette trapezoidal groove FY5 is located, the square-circular-cigarette third side plate FY23 is a plane where a waist of the square-circular-cigarette trapezoidal groove FY5 is located, and the square-circular-cigarette second side plate FY22 is perpendicular to the square-circular-cigarette first side plate FY21 and is located on an outer side of the square-circular-cigarette third side plate FY23; and the square-circular-cigarette second side plate FY22, the square-circular-cigarette third side plate FY23 and the square-circular-cigarette side wings FY231 are folded to form a square-circular-cigarette triangular prism FY51, and a bottom surface of the square-circular-cigarette triangular prism FY51 is located on the square-circular-cigarette first side plate FY21, so as to define the plane where the upper bottom of the square-circular-cigarette trapezoidal groove FY5 is located;

the square-circular-cigarette middle layer fixing sleeve FY3 is folded into a right-angle groove;

b, a square-circular-cigarette seventh side plate FY34 is folded along a second isosceles trapezoidal crease line into a square-circular-cigarette trapezoidal protrusion FY341, and square-circular-cigarette fifth side plates FY32 are folded towards a direction of square-circular-cigarette sixth side plates FY33 through square-circular-cigarette fourth side plates FY31, so that the square-circular-cigarette fifth side plates FY32 are relatively parallel to the square-circular-cigarette sixth side plates FY33 to be capable of forming two right-angle grooves, and the square-circular-cigarette trapezoidal protrusion FY341 is located between the two right-angle grooves;

the square-circular-cigarette filling and compressing positioning sleeve FY1 is folded into a first cuboid, which is consistent with the folding method of the square-cigarette filling and compressing positioning sleeve F1 in Embodiment 1; and the square-circular-cigarette partition board FY4 is provided, and does not require folding.

A cigarette case manufactured from the inner packaging case paper further includes a square-circular-cigarette case body FY6, a square-circular-cigarette middle layer fixing sleeve FY3 is located within a square-circular-cigarette inner cavity fixing sleeve FY2, the square-circular-cigarette inner cavity fixing sleeve FY2 is located within a square-circular-cigarette filling and compressing positioning sleeve FY1, and the square-circular-cigarette filling and compressing positioning sleeve FY1 is located within the square-circular-cigarette case body FY6;

the square-circular-cigarette case body FY6 internally has a cigarette accommodating cavity;

the cigarette accommodating cavity is divided into an upper layer, a middle layer and a lower layer, the right-angle grooves folded from the square-circular-cigarette middle layer fixing sleeve FY3 are inserted in the trapezoidal groove folded from the square-circular-cigarette inner cavity fixing sleeve FY2, the trapezoidal groove is wrapped with the first cuboid to form an upper layer, a middle layer and a lower layer, and the right-angle grooves are the middle layer; and each layer of cigarettes is internally provided with a independent square-circular-cigarette partition board FY4; and circular cigarettes in a square-circular-cigarette trapezoidal groove FY5 are changed into square-circle combined cigarettes under four kinds of fixing and extruding of the square-circular-cigarette filling and compressing positioning sleeve FY1, the square-circular-cigarette inner cavity fixing sleeve FY2, the square-circular-cigarette middle layer fixing sleeve FY3, and the square-circular-cigarette partition board FY4.

The upper layer and the lower layer each have seven cigarettes, the square-circular-cigarette partition board FY4 correspondingly used for the upper layer and the lower layer has six square-circular-cigarette vertical spacers FY42, while the middle layer has six cigarettes, and the partition board correspondingly used for the middle layer has five square-circular-cigarette vertical spacers FY42. Each square-circular-cigarette vertical spacer FY42 is located in a gap between the adjacent cigarettes.

Embodiment 3

As shown in FIG. 16 to FIG. 19, a first aspect of the present invention provides inner packaging case paper of a triangular cigarette. The packaging case paper includes a triangular-cigarette first inner cavity partition board S1 and a triangular-cigarette second inner cavity partition board S2.

The triangular-cigarette first inner cavity partition board S1 is provided with a plurality of parallel crease lines in advance, and is folded along the crease lines into a triangular-cigarette first triangular protrusion S11 and a triangular-cigarette first triangular groove S12 that are sequentially connected and have a cross section being a triangle, and the triangular-cigarette first triangular protrusion S11 and the triangular-cigarette first triangular groove S12 have the same size and shape.

The triangular-cigarette second inner cavity partition board S2 is provided with a plurality of parallel crease lines in advance, and is folded along the crease lines into a triangular-cigarette second triangular protrusion S21 and a triangular-cigarette second triangular groove S22 that are sequentially connected and have a cross section being a triangle, the triangular-cigarette second triangular protrusion S21 and the triangular-cigarette second triangular groove S22 have the same size and shape, and the triangular-cigarette second triangular groove S22 internally has a vertical triangular-cigarette spacer S23.

The folded triangular-cigarette first inner cavity partition board S1 and triangular-cigarette second inner cavity partition board S2 are stacked in an obverse-reverse opposite mode, the triangular-cigarette first triangular protrusion S11 of the triangular-cigarette first inner cavity partition board S1 on the upper layer is opposite to the triangular-cigarette second triangular groove S22 of the triangular-cigarette second inner cavity partition board S2 on the lower layer to be capable of forming a plurality of sequentially connected cigarette accommodating cavities with the cross section being a rhombus, and the vertical triangular-cigarette spacer S23 in the triangular-cigarette second triangular groove S22 is respectively connected to a triangular vertex of the triangular-cigarette first triangular protrusion S11 on the upper layer and a triangular vertex of the triangular-cigarette second triangular groove S22 on the lower layer, so as to divide the rhombic cigarette accommodating cavities into middle-layer triangular accommodating cavities on two sides of the vertical triangular-cigarette spacer S23.

The triangular-cigarette first triangular groove S12 is an upper-layer triangular accommodating cavity, and the triangular-cigarette second triangular protrusion S21 is a lower-layer triangular accommodating cavity; and the upper-layer triangular accommodating cavity, the middle-layer triangular accommodating cavities and the lower-layer triangular accommodating cavity generate fixing and extruding effects on the cigarettes, so that cross sections of circular cigarettes become triangles and the circular cigarettes are accommodated in the accommodating cavities.

A point where the triangular-cigarette first triangular groove S12 is connected with the triangular-cigarette second triangular protrusion S21 is a vertex of an upper-layer triangle and a lower-layer triangle, and the middle-layer triangular accommodating cavities on two sides of the vertex, the upper-layer triangular accommodating cavity above the vertex and the lower-layer triangular accommodating cavity below the vertex together form a square; two edges of the triangular-cigarette first triangular groove S12 are upper-part diagonal lines of the square, two edges of the triangular-cigarette second triangular protrusion S21 are lower-part diagonal lines of the square, and the vertical triangular-cigarette spacers S23 on left and right sides are two edges of the square; and the vertex is an intersection of the diagonal lines of the square.

Heights of triangles of the upper-layer triangular accommodating cavity, the middle-layer triangular accommodating cavities and the lower-layer triangular accommodating cavity are equal to half of a bottom edge of the triangle.

Five upper-layer triangular accommodating cavities are provided, and may accommodate five cigarettes 4; five lower-layer triangular accommodating cavities are provided, and may accommodate five cigarettes 4; and ten middle-layer triangular accommodating cavities are provided, and may accommodate ten cigarettes 4.

Materials of the triangular-cigarette first inner cavity partition board S1 and the triangular-cigarette second inner cavity partition board S2 are paperboards or food grade PVC sheets.

A folding method of inner packaging case paper of a triangular cigarette utilizes the described inner packaging case paper, and includes the following steps:

a, a triangular-cigarette first inner cavity partition board S1 is provided with a plurality of parallel crease lines in advance, and is folded along the crease lines into a triangular-cigarette first triangular protrusion S11 and a triangular-cigarette first triangular groove S12 that are sequentially connected and have a cross section being a triangle;

b, a triangular-cigarette second inner cavity partition board S2 is provided with a plurality of parallel crease lines in advance, and is folded along the crease lines into a triangular-cigarette second triangular protrusion S21 and a triangular-cigarette second triangular groove S22 that are sequentially connected and have a cross section being a triangle, and the triangular-cigarette second triangular groove S22 internally has a vertical triangular-cigarette spacer S23; and c, the folded triangular-cigarette first inner cavity partition board S1 and triangular-cigarette second inner cavity partition board S2 are stacked in an obverse-reverse opposite mode, the triangular-cigarette first triangular protrusion S11 of the triangular-cigarette first inner cavity partition board S1 on the upper layer is opposite to the triangular-cigarette second triangular groove S22 of the triangular-cigarette second inner cavity partition board S2 on the lower layer to be capable of forming a plurality of sequentially connected cigarette accommodating cavities with the cross section being a rhombus, and the vertical triangular-cigarette spacer S23 in the triangular-cigarette second triangular groove S22 is respectively connected to a triangular vertex of the triangular-cigarette first triangular protrusion S11 on the upper layer and a triangular vertex of the triangular-cigarette second triangular groove S22 on the lower layer, so as to divide the rhombic cigarette accommodating cavities into middle-layer triangular accommodating cavities on two sides of the vertical triangular-cigarette spacer S23.

A distance between the plurality of longitudinal crease lines on the triangular-cigarette first inner cavity partition board S1 and the triangular-cigarette second inner cavity partition board S2 is equal, and the distance is root 2 of one half of a height of the triangular-cigarette spacer S23.

A cigarette case contains the inner packaging case paper described in the present invention, and the cigarette case further includes a triangular-cigarette case body S3. An inner packaging case formed by folding from the inner packaging case paper is located in the triangular-cigarette case body S3, and a cigarette accommodating cavity generates fixing and extruding effects on cigarettes, so that circular cigarettes become triangles and are accommodated in the cigarette accommodating cavity. The cigarette case is a conventional flip type manual cigarette packaging case.

Embodiment 4

As shown in FIG. 20 to FIG. 22, inner packaging case paper of a hexagonal cigarette is provided. The packaging case paper includes two layers of hexagonal-cigarette inner cavity partition boards L1, the hexagonal-cigarette inner cavity partition boards L1 are provided with hexagonal-cigarette crease lines L13 in advance, and are folded along the crease lines into a hexagonal-cigarette trapezoidal protrusion L11 and a hexagonal-cigarette trapezoidal groove L12 that are sequentially connected and have a cross section being a trapezoid, the hexagonal-cigarette trapezoidal protrusion L11 and the hexagonal-cigarette trapezoidal groove L12 have the same size and shape, the folded two layers of hexagonal-cigarette inner cavity partition boards L1 are stacked in an obverse-reverse opposite mode, the hexagonal-cigarette trapezoidal protrusion L11 of the hexagonal-cigarette inner cavity partition board L1 on an upper layer is opposite to the hexagonal-cigarette trapezoidal groove L12 of the hexagonal-cigarette inner cavity partition board L1 on a lower layer to be capable of forming seven sequentially connected cigarette accommodating cavities with cross sections being hexagons, and the cigarette accommodating cavities generate fixing and extruding effects on cigarettes to cause cross sections of the cigarettes to become hexagons and the cigarettes be accommodated in the cigarette accommodating cavities.

Upper edges and two waists of the hexagonal-cigarette trapezoidal protrusion L11 and the hexagonal-cigarette trapezoidal groove L12 are equal, and the cigarette accommodating cavities are regular hexagons.

The hexagonal-cigarette trapezoidal protrusion L11 and the hexagonal-cigarette trapezoidal groove L12 are sequentially connected end to end.

Materials of the hexagonal-cigarette inner cavity partition boards L1 are paperboards. A folding method of inner packaging case paper includes the following steps:

a, hexagonal-cigarette inner cavity partition boards L1 have a plurality of longitudinal crease lines, and the hexagonal-cigarette inner cavity partition boards L1 are folded along the crease lines repeatedly for multiple times into a hexagonal-cigarette trapezoidal protrusion L11 and a hexagonal-cigarette trapezoidal groove L12 that are sequentially connected and have a cross section being a trapezoid; and b, the folded hexagonal-cigarette inner cavity partition boards L1 are stacked in an obverse-reverse opposite mode, so that the hexagonal-cigarette trapezoidal protrusion L11 of the hexagonal-cigarette inner cavity partition board L1 on the upper layer is opposite to the hexagonal-cigarette trapezoidal groove L12 of the hexagonal-cigarette inner cavity partition board L1 on the lower layer to constitute seven sequentially connected cigarette accommodating cavities with cross sections being hexagons.

A distance between the plurality of longitudinal crease lines on the hexagonal-cigarette inner cavity partition boards L1 is equal, so that the upper edges and two waists of the folded hexagonal-cigarette trapezoidal protrusion L11 and hexagonal-cigarette trapezoidal groove L12 with cross sections being trapezoids are equal to be capable of forming seven sequentially connected cigarette accommodating cavities with cross sections being the regular hexagons.

A cigarette case made of the inner packaging case paper and used for a hexagonal cigarette further includes a hexagonal-cigarette case body L2. An inner packaging case formed by folding from the inner packaging case paper is located in the hexagonal-cigarette case body L2, and a cigarette accommodating cavity generates fixing and extruding effects on cigarettes, so that the cigarettes become hexagons and are accommodated in the cigarette accommodating cavity.

The cigarette case is a conventional flip type manual cigarette packaging case.

Four layers of hexagonal-cigarette inner cavity partition boards L1 are provided, and the folded four layers of hexagonal-cigarette inner cavity partition boards L1 are stacked in an obverse-reverse opposite mode to form an upper-layer cigarette accommodating cavity, a middle-layer cigarette accommodating cavity, and a lower-layer cigarette accommodating cavity.

The upper-layer cigarette accommodating cavity and the lower-layer cigarette accommodating cavity include seven sequentially connected hexagonal cavities, while the middle-layer cigarette accommodating cavity includes six sequentially connected hexagonal cavities. That is to say, the upper layer and the lower layer may accommodate seven cigarettes 3, and the middle layer may accommodate six cigarettes 3.

It may be understood that the present invention is described through some embodiments, and those skilled in the art are aware that various changes or equivalent replacements can be made to these features and embodiments without departing from the spirit and scope of the present invention. In addition, under guidance of the present invention, these features and embodiments can be modified to adapt to specific situations and materials without departing from the spirit and scope of the present invention. Therefore, the present invention is not limited by the specific embodiments disclosed herein, and all embodiments falling within the scope of the claims of the present application are within the scope of protection of the present invention.

What is claimed is:

1. A method for manufacturing and packaging a special-shaped cigarette, comprising the following steps:
    1) designing inner packaging case paper capable of being folded into a special-shaped cigarette accommodating cavity;
    2) folding the inner packaging case paper to form the special-shaped cigarette accommodating cavity;
    3) filling an interior of the special-shaped cigarette accommodating cavity with an ordinary cigarette; and
    4) shelving for a certain period of time, so that a cross section of the ordinary cigarette changes from a circle to a special shape under fixing and extruding effects of the special-shaped cigarette accommodating cavity and the ordinary cigarette is accommodated in the special-shaped cigarette accommodating cavity, wherein
   a diameter of an inscribed circle of the special-shaped cigarette accommodating cavity is less than a diameter of the ordinary cigarette, and a material of the inner packaging case paper is a paperboard or a food grade polyvinyl chloride (PVC) sheet;
   the special-shaped cigarette is a square cigarette with a cross section being a square;
   wherein inner packaging case paper of the square cigarette comprises a square-cigarette filling and compressing positioning sleeve, a square-cigarette middle layer spacing sleeve, and a square-cigarette partition board;
   the square-cigarette filling and compressing positioning sleeve comprises a square-cigarette first folding baffle, a square-cigarette second folding baffle, a square-cigarette third folding baffle, a square-cigarette fourth folding baffle, a square-cigarette fifth folding baffle, and a square-cigarette sixth folding baffle, and the square-cigarette filling and compressing positioning sleeve is capable of being folded into a first cuboid; and the square-cigarette second folding baffle, the square-cigarette third folding baffle, the square-cigarette fourth folding baffle, and the square-cigarette sixth folding baffle are sequentially connected with four edges of the square-cigarette first folding baffle to serve as four side surfaces of the first cuboid, the square-cigarette first folding baffle serves as a bottom surface of the first cuboid, and the square-cigarette fifth folding baffle serves as a top surface of the first cuboid;
   the square-cigarette third folding baffle and the square-cigarette second folding baffle have the same size and shape, and located on left and right sides of the square-cigarette first folding baffle respectively, two square-cigarette first folding lug are connected to one end of the square-cigarette second folding baffle far away from the square-cigarette first folding baffle and one end of the square-cigarette third folding baffle far away from the square-cigarette first folding baffle respectively, and one end of each square-cigarette first folding lug far away from the square-cigarette first folding baffle has a square-cigarette first pin;
   the square-cigarette fourth folding baffle and the square-cigarette sixth folding baffle are located on an upper side and a lower side of the square-cigarette first folding baffle respectively, one end of the square-cigarette fourth folding baffle far away from the square-cigarette first folding baffle is connected with the square-cigarette fifth folding baffle, and the square-cigarette fifth folding baffle is provided with a square-cigarette first pre-notch corresponding to the square-cigarette first pins;
   a square-cigarette second folding lug and a square-cigarette third folding lug are sequentially connected to one end of the square-cigarette sixth folding baffle far away from the square-cigarette first folding baffle, a connection part of the square-cigarette sixth folding baffle and the square-cigarette second folding lug is provided with a square-cigarette pull buckle, and the square-cigarette second folding lug and the square-cigarette third folding lug are capable of being inserted into the first cuboid from the top surface of the first cuboid;
   the square-cigarette second folding lug and the square-cigarette third folding lug are capable of being pulled out of the first cuboid by pulling the square-cigarette pull buckle by hand;
   the square-cigarette middle layer spacing sleeve comprises a square-cigarette seventh folding baffle, a square-cigarette eighth folding baffle, and a square-cigarette ninth folding baffle, and the square-cigarette middle layer spacing sleeve is capable of being folded into a second cuboid with an opening in a side surface; and the square-cigarette seventh folding baffle serves as a top surface of the second cuboid, the square-cigarette eighth folding baffle serves as a bottom surface of the second cuboid, and the square-cigarette seventh folding baffle is connected with the square-cigarette eighth folding baffle through the square-cigarette ninth folding baffle;

the square-cigarette eighth folding baffle has a square second pre-notch, left and right sides of the square-cigarette eighth folding baffle extend outwards to have a square tenth folding baffle, one end of the square tenth folding baffle far away from the square-cigarette eighth folding baffle has a square second pin, the square tenth folding baffle is provided with a crease line, by overturning and folding along the crease line, the square second pin is capable of being inserted into the square second pre-notch, and the square tenth folding baffle forms a third cuboid with a cavity structure on the left and right sides of the square eighth folding baffle;

the second cuboid is inserted into the first cuboid, a top and bottom of the second cuboid form a fourth cuboid cavity with a top and bottom of the first cuboid respectively, and an inner cavity of the second cuboid and the fourth cuboid cavity limit shapes and sizes of the cigarettes so as to generate fixing and extruding effects on the cigarettes;

the square-cigarette partition board comprises a square plate main body and a plurality of square-cigarette vertical spacers perpendicular to the square plate main body and erected on the square plate main body, and each square-cigarette vertical spacer is inserted into a gap between the adjacent cigarettes so as to generate the fixing and extruding effects on the cigarettes on two sides of the square-cigarette vertical spacer; and circular cigarettes in the second cuboid and the fourth cuboid are changed into square cigarettes under three kinds of fixing and extruding of the square-cigarette filling and compressing positioning sleeve, the square-cigarette middle layer spacing sleeve, and the square-cigarette partition board.

2. The method of claim 1, wherein each layer of cigarettes is provided with the independent square-cigarette partition board, and a quantity of the square-cigarette vertical spacers is equal to a quantity of cigarettes in each layer minus one; a distance between the adjacent square-cigarette vertical spacers is less than a diameter of the cigarette, or a height of each square-cigarette vertical spacer is less than the diameter of the cigarette, or the distance between the adjacent square-cigarette vertical spacers and the height of the square-cigarette vertical spacers are both less than the diameter of the cigarette; materials of the square-cigarette filling and compressing positioning sleeve, the square-cigarette middle layer spacing sleeve, and the square-cigarette partition board are selected from a paperboard or a food grade PVC sheet; two square-cigarette first pre-notches are provided, and two square-cigarette first pins corresponding to the square-cigarette first pre-notches are also provided; and four square second pre-notches are provided, and four square second pins corresponding to the square second pre-notches are also provided.

3. A method for manufacturing and packaging a special-shaped cigarette, comprising the following steps:

1) Designing inner packaging case paper capable of being folded into a special-shaped cigarette accommodating cavity;
2) Folding the inner packaging case paper to form the special-shaped cigarette accommodating cavity;
3) Filling an interior of the special-shaped cigarette accommodating cavity with an ordinary cigarette; and
4) Shelving for a certain period of time, so that a cross section of the ordinary cigarette changes from a circle to a special shape under fixing and extruding effects of the special-shaped cigarette accommodating cavity and the ordinary cigarette is accommodated in the special-shaped cigarette accommodating cavity, wherein a diameter of an inscribed circle of the special-shaped cigarette accommodating cavity is less than a diameter of the ordinary cigarette, and a material of the inner packaging case paper is a paperboard or a food grade polyvinyl chloride sheet;

the special-shaped cigarette is a square-circle combined cigarette with a cross section at one end being a circle and a cross section at the other end being a square;

wherein inner packaging case paper of the square-circle combined cigarette comprises a square-circular-cigarette filling and compressing positioning sleeve, a square-circular-cigarette inner cavity fixing sleeve, a square-circular-cigarette middle layer fixing sleeve, and a square-circular-cigarette partition board;

the square-circular-cigarette filling and compressing positioning sleeve is the same as the square-cigarette filling and compressing positioning sleeve in claim 1;

the square-circular-cigarette inner cavity fixing sleeve comprises a square-circular-cigarette first side plate, left and right sides of the square-circular-cigarette first side plate are respectively connected with square-circular-cigarette second side plates, one end of each square-circular-cigarette second side plate far away from the square-circular-cigarette first side plate is connected with a square-circular-cigarette third side plate, and upper and lower edges of the square-circular-cigarette third side plate have square-circular-cigarette side wings;

the square-circular-cigarette second side plate and the square-circular-cigarette third side plate are folded towards a side of the square-circular-cigarette first side plate, and the square-circular-cigarette side wings are folded towards a side of the square-circular-cigarette second side plate to form a square-circular-cigarette trapezoidal groove, the square-circular-cigarette first side plate is a plane where an upper bottom of the square-circular-cigarette trapezoidal groove is located, the square-circular-cigarette third side plate is a plane where a waist of the square-circular-cigarette trapezoidal groove is located, and the square-circular-cigarette second side plate is perpendicular to the square-circular-cigarette first side plate and is located on an outer side of the square-circular-cigarette third side plate; and the square-circular-cigarette second side plate, the square-circular-cigarette third side plate and the square-circular-cigarette side wings are folded to form a square-circular-cigarette triangular prism, and a bottom surface of the square-circular-cigarette triangular prism is located on the square-circular-cigarette first side plate, so as to define the plane where the upper bottom of the square-circular-cigarette trapezoidal groove is located;

the square-circular-cigarette middle layer fixing sleeve comprises two square-circular-cigarette fourth side plates, two square-circular-cigarette fifth side plates, two square-circular-cigarette sixth side plates, and one square-circular-cigarette seventh side plate;

the square-circular-cigarette sixth side plates and the square-circular-cigarette fifth side plate are located on two sides of the square-circular-cigarette fourth side plate, and the square-circular-cigarette seventh side plate is located between the two square-circular-cigarette sixth side plates; and the square-circular-cigarette fifth side plates and the square-circular-cigarette sixth side plates are consistent in size and shape;

the square-circular-cigarette seventh side plate is a first isosceles trapezoid, one side close to the square-circular-cigarette fourth side plates is a bottom of the first isosceles trapezoid, the square-circular-cigarette seventh side plate has a second isosceles trapezoid crease line, similarly, one side close to the square-circular-cigarette fourth side plates is a bottom of the second isosceles trapezoid crease line, the square-circular-cigarette seventh side plates is capable of being folded to form a square-circular-cigarette trapezoidal protrusion by folding along the second isosceles trapezoid crease line, and a trapezoidal notch corresponding to the square-circular-cigarette seventh side plate is formed between the two square-circular-cigarette fifth side plates;

the square-circular-cigarette fifth side plates are folded towards a direction of the square-circular-cigarette sixth side plates through the square-circular-cigarette fourth side plates, the square-circular-cigarette fifth side plates are relatively parallel to the square-circular-cigarette sixth side plates to be capable of forming two right-angle grooves, and the square-circular-cigarette trapezoidal protrusion is located between the two right-angle grooves;

the right-angle grooves are inserted in the square-circular-cigarette trapezoidal groove, the square-circular-cigarette filling and compressing positioning sleeve is folded into a first cuboid, the square-circular-cigarette trapezoidal groove is wrapped with the first cuboid to form an upper layer, a middle layer and a lower layer, and the right-angle grooves are the middle layer;

the square-circular-cigarette partition board comprises a square-circular-cigarette plate main body and a plurality of square-circular-cigarette vertical spacers perpendicular to the square-circular-cigarette plate main body and erected on the square-circular-cigarette plate main body, each square-circular-cigarette vertical spacer is inserted into a gap between the adjacent cigarettes so as to generate fixing and extruding effects on cigarettes on two sides of the square-circular-cigarette vertical spacer; and circular cigarettes in the square-circular-cigarette trapezoidal groove are changed into cigarettes with one ends being square and the other ends being circular under four kinds of fixing and extruding of the square-circular-cigarette filling and compressing positioning sleeve, the square-circular-cigarette inner cavity fixing sleeve, the square-circular-cigarette middle layer fixing sleeve, and the square-circular-cigarette partition board.

4. The method of claim 3, wherein each layer of cigarettes is provided with the independent square-circular-cigarette partition board, and a quantity of the square-circular-cigarette vertical spacers is equal to the quantity of cigarettes in each layer minus one; a distance between the adjacent square-circular-cigarette vertical spacers is less than a diameter of the cigarette, or a height of each square-circular-cigarette vertical spacer is less than the diameter of the cigarette, or the distance between the adjacent square-circular-cigarette vertical spacers and the height of the square-circular-cigarette vertical spacers are both less than the diameter of the cigarette; and materials of the square-circular-cigarette filling and compressing positioning sleeve, the square-circular-cigarette inner cavity fixing sleeve, the square-circular-cigarette middle layer fixing sleeve, and the square-circular-cigarette partition board are selected from a paperboard or a food grade PVC sheet, and lengths of the square-circular-cigarette middle layer fixing sleeve and the square-circular-cigarette partition board are only half of an axial length of the cigarette.

5. A method for manufacturing and packaging a special-shaped cigarette, comprising the following steps:
1) Designing inner packaging case paper capable of being folded into a special-shaped cigarette accommodating cavity;
2) Folding the inner packaging case paper to form the special-shaped cigarette accommodating cavity;
3) Filling an interior of the special-shaped cigarette accommodating cavity with an ordinary cigarette; and
4) Shelving for a certain period of time, so that a cross section of the ordinary cigarette changes from a circle to a special shape under fixing and extruding effects of the special-shaped cigarette accommodating cavity and the ordinary cigarette is accommodated in the special-shaped cigarette accommodating cavity, wherein
a diameter of an inscribed circle of the special-shaped cigarette accommodating cavity is less than a diameter of the ordinary cigarette, and a material of the inner packaging case paper is a paperboard or a food grade polyvinyl chloride sheet the special-shaped cigarette is a triangular cigarette with a cross section being a triangle;
wherein the packaging case paper comprises a triangular-cigarette first inner cavity partition board and a triangular-cigarette second inner cavity partition board;
the triangular-cigarette first inner cavity partition board is provided with a plurality of parallel crease lines in advance, and is folded along the crease lines into a triangular-cigarette first triangular protrusion and a triangular-cigarette first triangular groove that are sequentially connected and have a cross section being a triangle, and the triangular-cigarette first triangular protrusion and the triangular-cigarette first triangular groove have the same size and shape;
the triangular-cigarette second inner cavity partition board is provided with a plurality of parallel crease lines in advance, and is folded along the crease lines into a triangular-cigarette second triangular protrusion and a triangular-cigarette second triangular groove that are sequentially connected and have a cross section being a triangle, the triangular-cigarette second triangular protrusion and the triangular-cigarette second triangular groovehave the same size and shape, and the triangular-cigarette second triangular groove internally has a vertical triangular-cigarette spacer;
the folded triangular-cigarette first inner cavity partition board and triangular-cigarette second inner cavity partition board are stacked in an obverse-reverse opposite mode, the triangular-cigarette first triangular protrusion of the triangular-cigarette first inner cavity partition board on the upper layer is opposite to the triangular-cigarette second triangular groove of the triangular-cigarette second inner cavity partition board on the lower layer to be capable of forming a plurality of sequentially connected cigarette accommodating cavities with the cross section being a rhombus, and the vertical triangular-cigarette spacer in the triangular-cigarette second triangular groove is respectively connected to a triangular vertex of the triangular-cigarette first triangular protrusion on the upper layer and a triangular vertex of the triangular-cigarette second triangular groove on the lower layer, so as to divide the rhombic cigarette accommodating cavities into middle-layer triangular accommodating cavities on two sides of the vertical triangular-cigarette spacer; and the triangular-cigarette first triangular groove is an upper-layer triangular accommodating cavity, and the triangular-cigarette second triangular protrusion is a lower-layer triangular accommodating cavity; and the upper-layer triangular accommodating cavity, the middle-layer triangular accommodating cavities and the lower-layer triangular accommodating cavity have fixing and extruding effects on the cigarettes, so that cross sections of circular cigarettes become triangles and the circular cigarettes are accommodated in the accommodating cavities.

6. The method of claim 5, wherein a point where the triangular-cigarette first triangular groove is connected with the triangular-cigarette second triangular protrusion is a vertex of an upper-layer triangle and a lower-layer triangle, and the middle-layer triangular accommodating cavities on two sides of the vertex, the upper-layer triangular accommodating cavity above the vertex and the lower-layer triangular accommodating cavity below the vertex together form a square; two edges of the triangular-cigarette first triangular groove are upper-part diagonal lines of the square, two edges of the triangular-cigarette second triangular protrusion are lower-part diagonal lines of the square, and the vertical triangular-cigarette spacers on left and right sides are two edges of the square; the vertex is an intersection of the diagonal lines of the square; heights of triangles of the upper-layer triangular accommodating cavity, the middle-layer triangular accommodating cavities and the lower-layer triangular accommodating cavity are equal to half of a bottom edge of the triangle; five upper-layer triangular accommodating cavities are provided, five lower-layer triangular accommodating cavities are provided, and ten middle-layer triangular accommodating cavities are provided; and materials of the triangular-cigarette first inner cavity partition board and the triangular-cigarette second inner cavity partition board are paperboards or food grade PVC sheets.

7. A method for manufacturing and packaging a special-shaped cigarette, comprising the following steps:
  1) Designing inner packaging case paper capable of being folded into a special-shaped cigarette accommodating cavity;
  2) Folding the inner packaging case paper to form the special-shaped cigarette accommodating cavity;
  1) Filling an interior of the special-shaped cigarette accommodating cavity with an ordinary cigarette; and
  2) Shelving for a certain period of time, so that a cross section of the ordinary cigarette changes from a circle to a special shape under fixing and extruding effects of the special-shaped cigarette accommodating cavity and the ordinary cigarette is accommodated in the special-shaped cigarette accommodating cavity, wherein a diameter of an inscribed circle of the special-shaped cigarette accommodating cavity is less than a diameter of the ordinary cigarette, and a material of the inner packaging case paper is a paperboard or a food grade polyvinyl chloride sheet;

the special-shaped cigarette is a hexagonal cigarette with a cross section being a hexagon;

wherein the packaging case paper comprises at least two layers of hexagonal-cigarette inner cavity partition boards, the hexagonal-cigarette inner cavity partition boards are provided with hexagonal-cigarette crease lines in advance, and are folded along the crease lines into a hexagonal-cigarette trapezoidal protrusion and a hexagonal-cigarette trapezoidal groove that are sequentially connected and have a cross section being a trapezoid, the hexagonal-cigarette trapezoidal protrusion and the hexagonal-cigarette trapezoidal groove have the same size and shape, the folded two layers of hexagonal-cigarette inner cavity partition boards are stacked in an obverse-reverse opposite mode, the hexagonal-cigarette trapezoidal protrusion of the hexagonal-cigarette inner cavity partition board on an upper layer is opposite to the hexagonal-cigarette trapezoidal groove of the hexagonal-cigarette inner cavity partition board on a lower layer to be capable of forming a plurality of sequentially connected cigarette accommodating cavities with cross sections being hexagons, and the cigarette accommodating cavities generate fixing and extruding effects on cigarettes to cause cross sections of the cigarettes to become hexagons and the cigarettes be accommodated in the cigarette accommodating cavities.

8. The method of claim 7, wherein upper edges and two waists of both the hexagonal-cigarette trapezoidal protrusion and the hexagonal-cigarette trapezoidal groove are equal to be capable of forming a plurality of sequentially connected cigarette accommodating cavities with cross sections being regular hexagons; the hexagonal-cigarette trapezoidal protrusion and the hexagonal-cigarette trapezoidal groove are sequentially connected end to end; the seven regular hexagons are provided; and materials of the hexagonal-cigarette inner cavity partition boards are paperboards or food grade PVC sheets.

\* \* \* \* \*